US011890609B2

(12) United States Patent
George et al.

(10) Patent No.: US 11,890,609 B2
(45) Date of Patent: Feb. 6, 2024

(54) HONEYCOMB BODIES WITH IMPROVED SKIN CTE AND ISOSTATIC STRENGTH AND METHODS OF MAKING THE SAME

(71) Applicant: Corning Incorporated, Corning, NY (US)

(72) Inventors: Jacob George, Horseheads, NY (US); Mallanagouda Dyamanagouda Patil, Corning, NY (US); Elizabeth Margaret Wheeler, Lindley, NY (US)

(73) Assignee: Corning Incorporated, Corning, NY (US)

( * ) Notice: Subject to any disclaimer, the term of this patent is extended or adjusted under 35 U.S.C. 154(b) by 99 days.

(21) Appl. No.: 17/017,979

(22) Filed: Sep. 11, 2020

(65) Prior Publication Data

US 2021/0077989 A1 Mar. 18, 2021

Related U.S. Application Data

(60) Provisional application No. 62/899,478, filed on Sep. 12, 2019.

(51) Int. Cl.
| | |
|---|---|
| *B01J 21/04* | (2006.01) |
| *B01J 21/06* | (2006.01) |
| *B01J 21/08* | (2006.01) |
| *B01J 21/12* | (2006.01) |
| *B01J 21/20* | (2006.01) |

(Continued)

(52) U.S. Cl.
CPC ........ *B01J 38/485* (2013.01); *B01D 39/2068* (2013.01); *B01D 46/2418* (2013.01); *B01D 53/94* (2013.01); *B01J 21/04* (2013.01); *B01J 21/063* (2013.01); *B01J 21/066* (2013.01); *B01J 21/08* (2013.01); *B01J 21/12* (2013.01); *B01J 21/20* (2013.01); *B01J 23/10* (2013.01); *B01J 23/92* (2013.01); *B01J 38/62* (2013.01);
(Continued)

(58) Field of Classification Search
CPC ........ B01J 21/04; B01J 21/063; B01J 21/066; B01J 21/08; B01J 21/12; B01J 21/20; B01J 23/10; B01J 23/92; B01J 38/485; B01J 38/62; B01J 38/66; B01D 39/2068; B01D 46/2418; B01D 53/94
See application file for complete search history.

(56) References Cited

U.S. PATENT DOCUMENTS

| | | | |
|---|---|---|---|
| 4,840,827 | A | 6/1989 | Mizutani et al. |
| 5,346,722 | A | 9/1994 | Beauseigneur et al. |

(Continued)

FOREIGN PATENT DOCUMENTS

| | | |
|---|---|---|
| EP | 0241269 A2 | 10/1987 |
| JP | 50-048858 U | 5/1975 |

(Continued)

*Primary Examiner* — Cam N. Nguyen
(74) *Attorney, Agent, or Firm* — Joseph M. Homa

(57) ABSTRACT

Honeycomb bodies and methods for treating a honeycomb bodies that include a skin surrounding a matrix of cells, the skin and the matrix of cells comprising a porous inorganic material. Methods include applying a buffer solution to only the porous inorganic material of the skin and coating the porous inorganic material of the skin with an oxide slurry. The oxide slurry includes an oxide or a precursor of the oxide configured to increase the isostatic strength of the honeycomb body. After treatment, the honeycomb body may be dried.

21 Claims, 12 Drawing Sheets

(51) Int. Cl.
  *B01J 23/10* (2006.01)
  *B01J 23/92* (2006.01)
  *B01J 38/48* (2006.01)
  *B01J 38/62* (2006.01)
  *B01J 38/66* (2006.01)
  *B01D 39/20* (2006.01)
  *B01D 46/24* (2006.01)
  *B01D 53/94* (2006.01)

(52) U.S. Cl.
  CPC ....... *B01J 38/66* (2013.01); *B01D 2255/9155* (2013.01); *B01D 2279/30* (2013.01)

(56) References Cited

U.S. PATENT DOCUMENTS

| | | | |
|---|---|---|---|
| 5,629,067 A | 5/1997 | Kotani et al. | |
| 6,908,874 B2 | 6/2005 | Woodhead et al. | |
| 8,163,349 B2* | 4/2012 | Glasson | B01J 37/08 |
| | | | 427/376.2 |
| 8,263,512 B2* | 9/2012 | Fernando | C04B 35/636 |
| | | | 501/153 |
| 8,518,857 B2 | 8/2013 | Bliss et al. | |
| 8,999,224 B2* | 4/2015 | Beall | C04B 35/638 |
| | | | 264/630 |
| 9,255,036 B2* | 2/2016 | Drury | C04B 41/4578 |
| 9,833,927 B2* | 12/2017 | Chapman | B28B 19/0038 |
| 10,195,814 B2 | 2/2019 | Yamamoto et al. | |
| 10,329,204 B2* | 6/2019 | Drury | C04B 41/45 |
| 10,399,074 B2* | 9/2019 | Okazaki | C04B 38/06 |
| 10,603,633 B2* | 3/2020 | Bubb | C04B 35/14 |
| 10,883,400 B2* | 1/2021 | Suzuki | F01N 3/2828 |
| 11,007,672 B2* | 5/2021 | Okazaki | C04B 38/0006 |
| 11,020,700 B2* | 6/2021 | Tamai | B01D 46/2455 |
| 11,117,083 B2* | 9/2021 | Beall | B28B 3/269 |
| 2009/0142540 A1 | 6/2009 | Solsky et al. | |
| 2020/0299196 A1* | 9/2020 | Merkel | C04B 38/0006 |
| 2021/0220767 A1* | 7/2021 | Beall | B01D 46/2482 |
| 2021/0355039 A1* | 11/2021 | Divens-Dutcher | |
| | | | B01J 37/0215 |
| 2022/0023792 A1* | 1/2022 | Beall | B01D 46/249 |

FOREIGN PATENT DOCUMENTS

| | | |
|---|---|---|
| JP | 53-133860 U | 10/1978 |
| JP | 56-129042 A | 10/1981 |
| JP | 63-144836 U | 9/1988 |
| JP | 5144713 B2 | 2/2013 |
| KR | 10-0670954 B1 | 1/2007 |
| WO | 2020/005663 A1 | 1/2020 |
| WO | 2020/005665 A1 | 1/2020 |

* cited by examiner

HONEYCOMB BODIES WITH IMPROVED SKIN CTE AND ISOSTATIC STRENGTH AND METHODS OF MAKING THE SAME

CROSS APPLICATION TO RELATED APPLICATION

This application claims the benefit of priority under 35 U.S.C § 120 of U.S. Provisional Application Ser. No. 62/899,478 filed on Sep. 12, 2019, the content of which is relied upon and incorporated herein by reference in its entirety.

FIELD

The present disclosure relates to honeycomb bodies. In particular, the present disclosure relates to porous ceramic honeycomb bodies for products such as particulate filters and catalytic converters.

BACKGROUND

Porous ceramic cellular, or honeycomb, bodies are used for a variety of purposes, such as for catalytic converters and particulate filters, which can be utilized, for example, in exhaust after-treatment systems of internal combustion engines.

BRIEF SUMMARY

The present disclosure is directed to porous ceramic cellular, or honeycomb, bodies and methods of treating the porous ceramic cellular, or honeycomb, bodies. The honeycomb bodies comprise a matrix of cells surrounded by a skin portion. Methods disclosed herein are useful to increase the isostatic strength of the honeycomb bodies while maintaining a desirably low coefficient of thermal expansion (CTE) of the skin. In some embodiments, an oxide slurry is applied to a skin portion of a ceramic honeycomb body in order to improve the isostatic strength. As used herein, the term "slurry" means a mixture comprising a solvent and particles that are insoluble in the solvent. The solvent can be aqueous or non-aqueous.

The oxide slurry at least partially fills pores, which may be referred to herein as pores, on the surface of and within the skin of the honeycomb body, thereby improving the overall isostatic strength of the body by increasing the density of the skin. In addition, oxide slurry fill pores on the surface of and within the walls of one or more (for example 1 to 5) cells of the honeycomb body inside the skin to provide increased isostatic strength. To prevent micro-cracks of the material of the skin from being filled with inorganic particles of the oxide slurry, methods disclosed herein also comprise applying a buffer solution to the skin before the oxide slurry is applied. For example, the depositing of oxide particles into the micro-cracks might result in an increase in the CTE of the material of the skin. The buffer solution forms a gel when it comes in contact with the oxide slurry, e.g., due to a contrast in pH of the oxide slurry and the buffer. This gel can prevent oxide slurry particles from migrating into micro-cracks that exist in the skin, e.g., beneath, or extending from, pores in the skin. The pH of the buffer solution can be tuned to prevent either complete or controlled migration of oxide particles into the pores and micro-cracks. In this way, by preventing the oxide slurry from entering these micro-cracks, the isostatic strength of the honeycomb body can be improved without an undesirably large increase in the CTE of the material of the skin.

Some embodiments are directed to a method for treating a honeycomb body comprising a skin surrounding a matrix of cells defined by a plurality of intersecting walls, the skin and the matrix of cells comprising a porous inorganic material. The method comprises applying a buffer solution to the skin, the buffer solution comprising a first pH, wherein the porous inorganic material of the skin comprises a plurality of micro-cracks, and wherein applying the buffer solution to the skin comprises introducing the buffer solution into the plurality of micro-cracks; and coating the skin with an oxide slurry and depositing inorganic particles of the oxide slurry in pores of the porous inorganic material of the skin to increase a first density of the skin relative to a second density of the porous inorganic material of the matrix, the inorganic particles comprising particles of an oxide or a precursor of the oxide; wherein the oxide slurry comprises a second pH different from the first pH, and wherein the oxide slurry and the buffer solution form a gel that inhibits the inorganic particles of the oxide or the precursor of the oxide from entering the plurality of micro-cracks.

In some embodiments, applying the buffer solution to the skin of the honeycomb comprises applying the buffer solution to only the skin of the honeycomb body and wherein coating the skin comprises applying the oxide slurry to only the skin of the honeycomb body.

In some embodiments, the oxide slurry seeps into at least some of the intersecting walls of peripheral cells in the matrix of cells.

In some embodiments, applying the buffer solution to the skin comprises applying the buffer solution to an exterior surface of the skin.

In some embodiments, the buffer solution seeps into at least some of the intersecting walls of peripheral cells in the matrix of cells.

In some embodiments, the method further comprises, after coating the skin with the oxide slurry, applying a washcoat slurry comprising a catalytic material to at least the intersecting walls of the honeycomb body.

In some embodiments, the skin comprises a porous ceramic material that comprises the oxide.

In some embodiments, the porous ceramic material of the skin comprises cordierite and the oxide comprises cordierite or a cordierite precursor.

In some embodiments, the buffer solution is an aqueous solution comprising one or more of: ammonium chloride, ammonium nitrate, ammonium acetate, ammonium hydroxide, potassium phosphate, sodium hydroxide, boric acid, potassium chloride, sodium chloride, potassium carbonate, potassium borate, potassium hydroxide, hydrochloric acid, or potassium acid phthalate.

In some embodiments, the oxide slurry comprises colloidal alumina.

In some embodiments, the oxide slurry comprises nanoparticle silica soot.

In some embodiments, the oxide slurry comprises colloidal titania, colloidal zirconia, or colloidal ceria.

In some embodiments, the oxide slurry comprises a combination of two or more oxides or oxide precursors.

In some embodiments, the oxide slurry comprises colloidal aluminum silicate.

In some embodiments, the density of the skin after coating is 30% to 60% greater than a density of the porous inorganic material of the matrix.

In some embodiments, the method increases the coefficient of thermal expansion of the skin measured at 800° C. by no more than two and a half times.

In some embodiments, the method increases the isostatic strength of the honeycomb body by 15% or more.

In some embodiments, the method increases the isostatic strength of the honeycomb body by 40% or more.

In some embodiments, the first pH is greater than the second pH.

In some embodiments, the second pH is greater than the first pH.

Some embodiments are directed to a method for treating a honeycomb body, the honeycomb body comprising a skin surrounding a matrix of cells defined by a plurality of intersecting wall. The method comprises applying a buffer solution to only the skin; coating the skin with an oxide slurry, the oxide slurry comprising an oxide or a precursor of the oxide to deposit inorganic particles in pores of a porous material of the skin; and drying the honeycomb body.

In some embodiments, the method increases an isostatic strength of the honeycomb body by 40% or more.

Some embodiments are directed to a honeycomb body. The honeycomb body comprises a matrix of cells defined by a plurality of intersecting walls comprising a porous inorganic material; and a skin surrounding the matrix of cells, the skin comprising a coated porous inorganic material comprising: the porous inorganic material, and oxide particles deposited in pores of the porous inorganic material, wherein pores of the of the porous inorganic material of the intersecting walls are substantially free of the oxide particles and wherein microcracks of the coated porous inorganic material are substantially free of the oxide particles.

In some embodiments, the porous inorganic material defining the matrix of cells comprises a first density, and wherein the coated porous inorganic material of the skin comprises a second density greater than the first density.

In some embodiments, the second density is at least 30% greater than the first density.

In some embodiments, a skin loading of 30 wt. % or more.

In some embodiments, the honeycomb body comprises an isostatic strength of 250 psi or more.

In some embodiments, the oxide particles comprise oxide nanoparticles.

BRIEF DESCRIPTION OF THE DRAWINGS

The accompanying figures, which are incorporated herein, form part of the specification and illustrate embodiments of the present disclosure. Together with the description, the figures further serve to explain the principles of and to enable a person skilled in the relevant art(s) to make and use the disclosed embodiments. These figures are intended to be illustrative, not limiting. Although the disclosure is generally described in the context of these embodiments, it should be understood that it is not intended to limit the scope of the disclosure to these particular embodiments. In the drawings, like reference numbers indicate identical or functionally similar elements.

DETAILED DESCRIPTION

Figure 1:
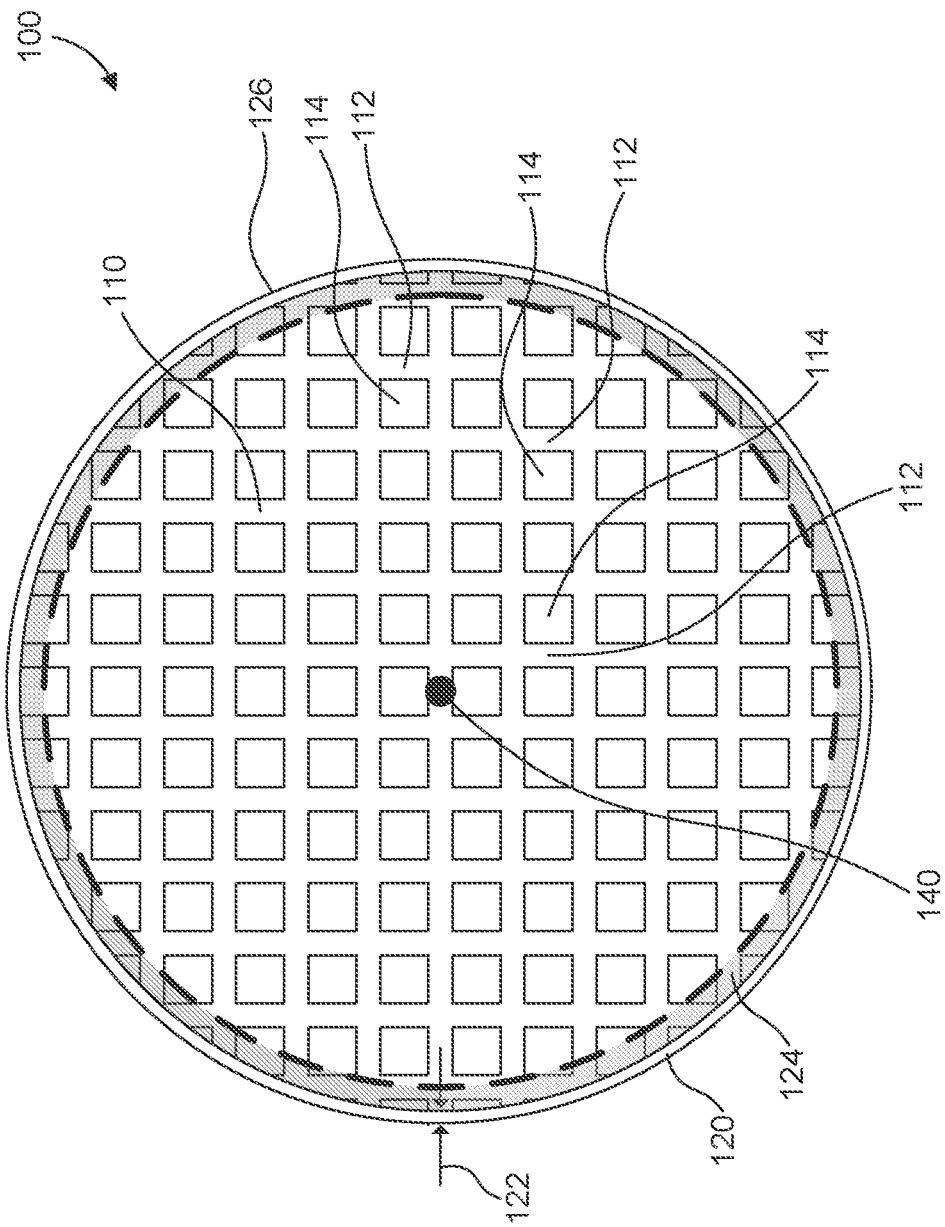
FIG. 1 illustrates a top view of a honeycomb body according to some embodiments.

The following examples are illustrative, but not limiting, of the present disclosure. Other suitable modifications and adaptations of the variety of conditions and parameters normally encountered in the field, and which would be apparent to those skilled in the art, are within the spirit and scope of the disclosure.

Ceramic honeycomb bodies that are used, for example, as catalytic converters and particulate filters within exhaust systems of internal combustion engines desirably have high isostatic strengths in order to withstand pressures induced by a canning process utilized to package the ceramic honeycomb body for use within an exhaust system. A high isostatic strength helps the ceramic honeycomb body avoid fracture during the canning process and during use. And, because the exhaust systems are cyclically subjected to high temperatures, it is also desirable for these parts have low coefficients of thermal expansion (CTE) to avoid dimensional variability that might result in fracture during use.

According to embodiments discussed herein, to increase the isostatic strength of a ceramic honeycomb body, a skin portion of the honeycomb body is coated with an oxide slurry comprising oxide particles dispersed throughout. These oxide particles can be nanoparticles. The slurry is coated on a skin the honeycomb body such that oxide particles infiltrate and deposit within pores present in the ceramic material of the skin. By depositing within the pores, the oxide particles act to increase the isostatic strength of the ceramic honeycomb body.

It is beneficial for these ceramic honeycomb bodies to maintain low coefficients of thermal expansion in order to avoid temperature-based dimensional changes, which might potentially result in fracture, of the honeycomb bodies when the honeycomb bodies are exposed to high temperatures within exhaust systems. While coating the honeycomb bodies can be useful for increasing strength, oxide particles during the coating process might be deposited into or migrate into the micro-cracks present within the skin (e.g., these micro-cracks may extend from the pores in which the oxide particles are deposited). Similar to stress-relief features, the micro-cracks can be useful during thermal cycling of the honeycomb bodies by providing a mechanism that allows the ceramic material to expand into during heating (e.g., thereby closing the micro-cracks during thermal expansion). However, when the micro-cracks are filled with particles, e.g., the inorganic particles of the oxide slurry, the micro-cracks cannot close to facilitate thermal expansion of the material, which results in a significant increase in CTE of the skin of the honeycomb bodies because the ceramic material is forced to expand outwardly rather than expanding internally to close the micro-cracks.

To assist in mitigating an undesirable CTE increase caused by depositing of particles into the micro-cracks, a buffer solution is applied to the skin of the honeycomb body prior to the application of the oxide slurry. The buffer solution has a different pH than the oxide slurry, which results in a precipitation reaction at a contact interface between the buffer solution and the oxide slurry. For example, the precipitation reaction can be used to cause agglomeration of slurry particles (e.g., inorganic oxide nano-particles) to form larger agglomerates at the entrance of the micro-cracks. These larger agglomerates impede oxide particle migration into the interior of micro-cracks.

Because the CTE of honeycomb bodies treated with both a buffer and an oxide slurry according to embodiments discussed herein remains low, the expected performance and lifespan of the honeycomb body under operating conditions is maintained, while the deposited particles from the oxide slurry improves strength of the honeycomb body. For example, an increase in strength can reduce the chance of ceramic honeycomb parts being damaged during handling, transportation, use, or installation, such as a canning process. In some embodiments, the oxide slurry is applied to only the skin of the honeycomb body (resulting in at most limited migration of the oxide slurry into the cell matrix of a honeycomb body), which advantageously increases the isostatic strength of the honeycomb body while preserving the material properties (e.g., porosity, CTE, etc.) and corresponding functionality of the cell matrix. Furthermore, the process of coating the honeycomb bodies with a buffer solution prior to applying an oxide slurry coating can be readily implemented as described herein.

FIG. 1 illustrates a top view of a honeycomb body 100 according to some embodiments. Honeycomb body 100 comprises a matrix of cells 110 defined by a porous inorganic material, for example a ceramic material. For example, the porous ceramic of matrix 110 can be a porous cordierite ceramic material. As shown in FIG. 1, the matrix has a circular cross-section; however, in some embodiments, the cross-sectional shape of honeycomb body 100 can be an ellipse, an oval, a triangle, a tri-lobed shape, a square, a rectangle, a polygon, or any other suitable shape. With respect to the coordinate system in FIG. 1, each cell 114 within matrix 110 is defined by intersecting porous walls 112, which intersect with each other by extending parallel with respect to each other along a y-axis and an x-axis, with the channels or cells defined by the intersecting walls extending longitudinally with respect to a z-axis. A central longitudinal extends through the center of honeycomb body 100, for example at center point 140, parallel to the z-axis, defining the direction in which honeycomb body 100 was extruded during manufacturing.

In some embodiments, at least the walls 112 of cells 114 within matrix 110 are coated with a washcoat slurry comprising a catalytic material after the skin is coated with the oxide slurry. A catalyst washcoat can be applied to walls 112 of matrix 110 to deposit the catalytic material in and/or on the intersecting walls. The catalyst washcoat can comprise a catalyst such as platinum, palladium, rhodium, or any other catalytic material and/or various alloys thereof.

Honeycomb body 100 also comprises a skin portion 120, which comprises a porous inorganic material, for example a ceramic, and surrounding matrix 110 on an outer radial periphery of body 100. In some embodiments, the porous ceramic of skin 120 is a porous cordierite ceramic material. In some embodiments, the skin portion 120 and the walls 112 are made from the same porous inorganic material. For example, skin 120 can be extruded along with extrusion of honeycomb matrix 110 during the same extrusion process. In another embodiment, the skin 120 is applied to honeycomb body 100 post-extrusion. For example, in some embodiments, an after-applied skin is applied as a ceramic-based skin cement onto an outer periphery of a dried green body. In some embodiments, skin 120 has a skin thickness 122 that is substantially uniform about the radial periphery of the honeycomb body 100. In some embodiments, skin thickness 122 is in the range of 0.05 mm to 5 mm, including subranges. For example, skin thickness 122 can be 0.05 mm, 0.1 mm, 0.125 mm, 0.15 mm, 0.25 mm, 0.5 mm, 0.75 mm, or 5 mm, or within a range having any two of these values as endpoints.

Figure 2:
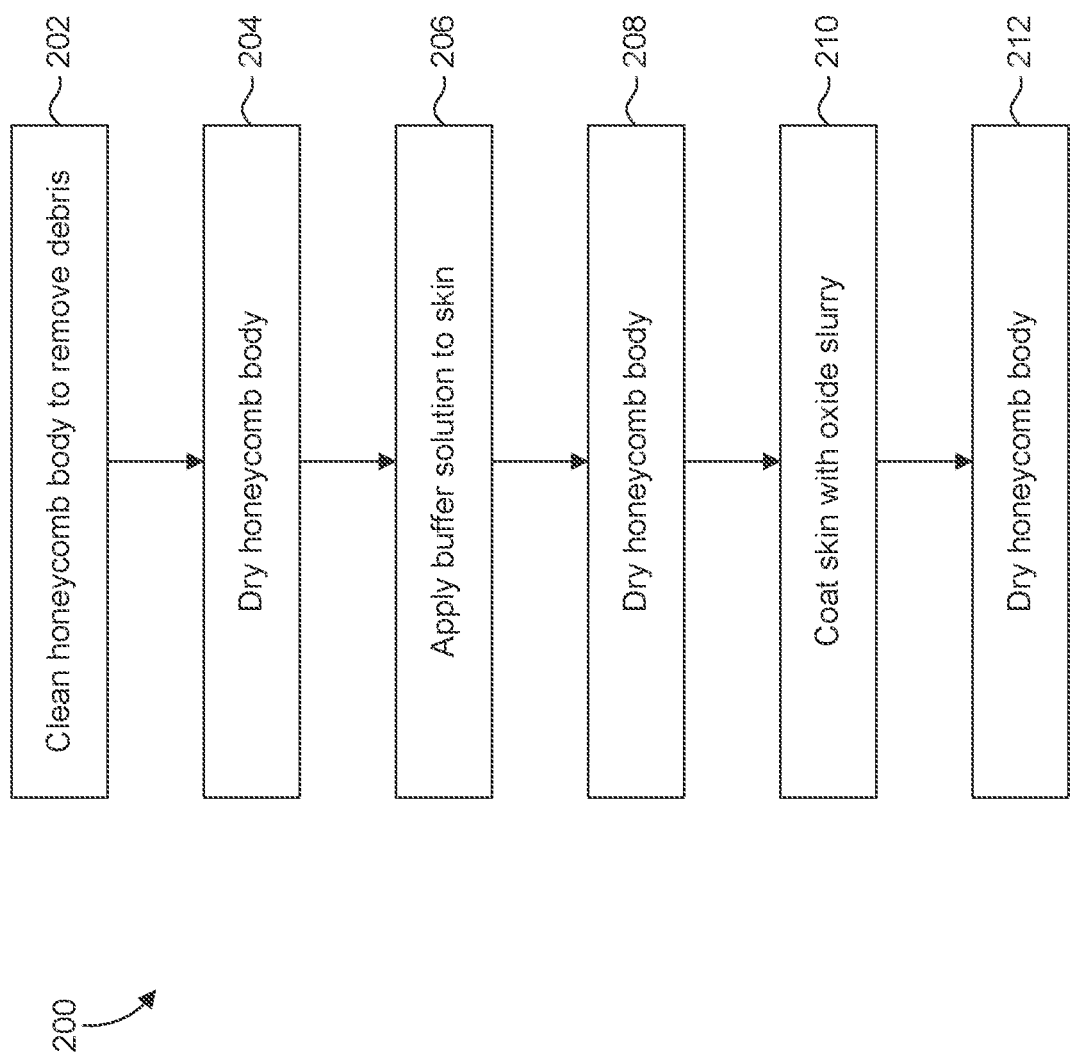
FIG. 2 is a block diagram representing a method for treating a honeycomb body according to some embodiments.

A block diagram for a method 200 is shown in FIG. 2, which describes a method for treating a honeycomb body comprising a skin portion surrounding a matrix of cells, for example honeycomb body 100. As described herein, the method 200 of FIG. 2 enables the isostatic strength of the honeycomb body to be increased without imparting a significant increase in CTE.

The method 200 can comprise a step 202 in which the honeycomb body is first cleaned of debris and/or a step 204 in which the honeycomb body is dried, e.g., in an oven. Drying can be performed at, for example, about 100° C. for about two hours. The honeycomb body can then be cooled to room temperature. The steps 202 and 204 can be optionally removed, or replaced or supplemented by other steps useful in preparing the honeycomb body for subsequent processing.

In step 206, a buffer solution is applied to the porous inorganic material of the skin, for example an exterior surface 126 of skin 120. In some embodiments, the buffer solution is applied only to the skin, for example, only to the exterior surface 126 of skin 120, as opposed to, for example, submerging the entire honeycomb body to the buffer solution. By applying the buffer solution to only the skin of the honeycomb body all or a large majority of cells within the matrix of cells, for example matrix 110, remain uncoated by the buffer solution. That is, even if applied only to the skin, some buffer solution may seep from the skin into the porous inorganic material of the walls of the cells within the matrix adjacent the skin during application.

Buffer solution that seeps from the skin might seep into a peripheral region 124 of cells within the matrix 110 adjacent the skin 120 due to the porous nature of the ceramic material defining the skin and matrix of the honeycomb body 100. As used herein, the term "peripheral-most cells" means the walls 112 that define full or partial cells 114 within matrix 110 closest to and directly abutting the skin 120. In some embodiments, the peripheral region 124 comprises only the peripheral-most cells, but the buffer solution may seep further into the matrix 110 to cells adjacent to and interior of the peripheral-most cells, particularly in embodiments in which the material of the walls 112 is highly porous. For example, in the embodiment of FIG. 3, the peripheral region 124 is approximately the width of one cell, but due to partial cells, comprises the peripheral-most cells and portions of the cells of the next two subsequently inwardly adjacent rings of cells. In preferred embodiments, the peripheral region 124 is limited to the outermost five rings of cells or fewer. In some embodiments, the remainder of matrix 110 remains free or substantially free of buffer solution. As used herein, the term "substantially free," when used to describe the absence of a particular feature, means that the feature is present at an amount less than or equal to 1 wt. %, for example 0 wt. % to 1 wt. %.

The buffer solution can be applied to the skin using a suitable application process, such as but not limited to, a spraying process, a dip coating process, a cascading or waterfall process, or a painting process. In some embodiments, only the skin of the honeycomb body is treated by using a brush or other applicator to apply a buffer solution to an exterior surface of the skin.

In some embodiments, the buffer solution is an aqueous solution, for example an aqueous solution comprising one or more of ammonium chloride, ammonium nitrate, ammonium acetate, ammonium hydroxide, potassium phosphate, sodium hydroxide, boric acid, potassium chloride, sodium chloride, potassium carbonate, potassium borate, potassium hydroxide, potassium acid phthalate, or hydrochloric acid. The pH of the buffer solution can be basic (i.e., greater than 7), acidic (i.e., less than 7), or neutral. Exemplary acidic buffer solutions include, solutions of potassium chloride (pH of 2), hydrochloric acid (pH of 2), or potassium acid phthalate (pH of 4). In some embodiments, the pH of the buffer solution is different from the pH of an oxide slurry. In some embodiments, the pH of the buffer solution is greater than the pH of an oxide slurry. In some embodiments, the pH of the buffer solution is less than the pH of an oxide slurry. For example, the buffer solution can have a pH of 2, while the oxide slurry is colloidal alumina, which has a pH of 8.

In step 210, the porous inorganic material of the skin is coated with an oxide slurry. In some embodiments, the honeycomb body treated with the buffer solution is fully or partially dried (step 208, for example) before the oxide slurry is applied in step 210. In some embodiments, step 208 partially dries the buffer such that at least 5% of the buffer is dry. In some embodiments, drying the buffer is performed at room temperature (e.g., approximately 23-25° C.) in a down draft arrangement or by use of a blower. Alternatively, the buffer can be dried, e.g., in an oven, at a temperature above room temperature. In some embodiments, the drying temperature does not exceed 100° C.

In some embodiments, the oxide slurry coated in step 210 is applied to only the porous inorganic material of the skin of the honeycomb body, for example exterior surface 126 of skin 120. By applying the oxide slurry to only the skin of the honeycomb body the vast majority if not all of cells within the matrix of cells, for example matrix 110, remain uncoated by the oxide slurry. Applying the oxide slurry to only the porous inorganic material of the skin can be carried out by directly contacting only surfaces of the skin with the oxide slurry during coating of the oxide slurry. Similar to the buffer solution, oxide slurry might seep from the skin into the porous inorganic material of cells within the matrix adjacent the skin during application. However, oxide slurry is not directly applied to the walls of the matrix within the honeycomb body.

Oxide slurry that seeps from the skin might seep into peripheral region 124 of cells within the matrix 110 adjacent the skin 120 due to the porous nature of the ceramic material defining the skin and matrix of the honeycomb body. In some embodiments, the remainder of matrix 110 remains free or substantially free of oxide particles deposited using the oxide slurry, i.e., comprising less than a marginal amount of oxide slurry, such as less than 1 wt %.

In some embodiments, the oxide slurry is applied directly on top of the buffer applied in step 206. For example, once the buffer is dried, for example in step 208, the oxide slurry can be applied directly over the buffer such that the dried buffer solution and the oxide slurry are in direct contact with each other at a contact interface within the honeycomb body.

In some embodiments, the honeycomb body coated with the oxide slurry in step 210 is dried in step 212. For example, in some embodiments the honeycomb body can be dried in an oven, e.g., at about 50-100° C., such as 70° C. for a set amount of time, e.g., about 4-6 hours.

The oxide slurry applied in step 210 comprises particles of an oxide or a precursor to an oxide. In some embodiments, the oxide or oxide-precursor particle are nanoparticles. As used herein, "nanoparticle" means a particle having at least one dimension in the range of 1 nanometer to 100 nanometers in size. The size of a nanoparticle can be measured by scanning electron microscopy or a dynamic light scattering (DLS) particle size analyzer. An average particle size of a batch of particles can be measured by measuring a sample of the particles using scanning electron microscopy or a DLS particle size analyzer, or can be calculated from the Brunauer-Emmett-Teller (BET) surface area of the sample. Unless indicated otherwise, the size of a nanoparticle discussed herein is measured by scanning electron microscopy and an average particle size of a batch of particles discussed herein is calculated from the Brunauer-Emmett-Teller (BET) surface area of the sample.

In some embodiments, the oxide slurry comprises ceramic particles of the same type or composition as the porous inorganic material of the skin, or ceramic particles that are precursors of the porous inorganic material of the skin. For example, if the skin comprises cordierite, then the oxide slurry can comprise cordierite particles or particles of one or more cordierite precursors, such as silica particles or alumina particles.

The oxide particles in the slurry can comprise, but are not limited to, aluminum oxide (alumina) particles, silicon oxide (silica) particles, titanium oxide (titania) particles, zirconium oxide (zirconia) particles, cerium oxide (ceria) particles, or a combination thereof. The oxide precursor particles in the slurry can comprise, but are not limited to, aluminum oxide precursor particles, silicon oxide precursor particles, titanium oxide precursor particles, zirconium oxide precursor particles, cerium oxide precursor particles, or a combination of two or more of these types of metal-oxide precursor particles. In some embodiments, the oxide or oxide precursor particles have an average particle size in the range of 10 nanometers to 100 nanometers, including subranges. For example, the oxide or oxide precursor particles can have an average particle size of 10 nanometers, 20 nanometers, 30 nanometers, 40 nanometers, 50 nanometers, 60 nanometers, 70 nanometers, 80 nanometers, 90 nanometers, or 100 nanometers, or within any range having any two of these values as endpoints.

As used herein, metal-oxide "precursor" or "precursor particle" means a particle that is a source particle for a metal-oxide particle. A metal-oxide precursor particle is capable of undergoing a chemical change that transforms it into a metal-oxide particle. The chemical change may be induced by the application of energy, such as heat. Exemplary metal-oxide precursor particles include oxide hydroxide particles, oxide acetate particles, and oxide nitrate particles.

In some embodiments, aluminum oxide precursor particles include colloidal aluminum oxide hydroxide (also called boehmite or alumina hydrate) particles. In some embodiments, the aluminum oxide hydroxide particles are NYACOL® Colloidal Alumina manufactured by Nyacol Nano Technologies, Inc. In some embodiments, the aluminum oxide hydroxide particles are NYACOL® AL20 Colloidal Alumina manufactured by Nyacol Nano Technologies, Inc. In some embodiments, the aluminum oxide hydroxide particles are DISPERAL® colloidal boehmite alumina manufactured by Sasol. In some embodiments, the aluminum oxide hydroxide particles are DISPERAL® P2 colloidal boehmite alumina manufactured by Sasol.

In some embodiments, titanium oxide precursor particles include colloidal titanium oxide particles with hydroxyl groups on the surface (i.e., colloidal titanium oxide hydroxide). In some embodiments, the titanium oxide precursor particles are NYACOL® Colloidal Titanium Dioxide manufactured by Nyacol Nano Technologies, Inc. In some embodiments, the titanium oxide precursor particles are NYACOL® TiSol A Colloidal Titanium Dioxide manufactured by Nyacol Nano Technologies, Inc.

In some embodiments, silicon oxide precursor particles include colloidal silica particles with hydroxyl groups on the surface (i.e., colloidal silicon oxide hydroxide). For example, the silicon oxide precursor particles can include LUDOX® colloidal silica. In some embodiments, the zirconium oxide precursor particles are colloidal zirconia particles with hydroxyl groups on the surface (i.e., colloidal zirconium oxide hydroxide) or colloidal zirconium acetate. In some embodiments, the zirconium oxide particles are NYACOL® Colloidal Zirconia manufactured by Nyacol Nano Technologies, Inc.

In some embodiments, cerium oxide precursor particles include colloidal cerium acetate or cerium nitrite. In some embodiments, the cerium oxide precursor particles are NYACOL® Colloidal Cerium Oxide manufactured by Nyacol Nano Technologies, Inc. In some embodiments, the cerium oxide precursor particles are NYACOL® CeO2(AC) manufactured by Nyacol Nano Technologies, Inc.

In some embodiments, the oxide slurry comprises a nanoparticle silica soot. In some embodiments, the nanoparticle silica soot comprises fumed silica soot, for example CABOSIL® EH5 manufactured by Cabot Corporation. In some embodiments, the oxide slurry comprises colloidal aluminum silicate. In some embodiments, the colloidal alumina silicate is made by mixing a colloidal slurry of alumina (e.g., NYACOL® Colloidal Alumina) and a colloidal slurry of silica (e.g., NexSil™ 20A manufactured by Nyacol Nano Technologies, Inc.). In some embodiments, the colloidal alumina silicate is colloidal alumina silicate manufactured by Nyacol Nano Technologies, Inc.

In some embodiments, the oxide slurry, e.g., due to its type and amount, applied in step 210 increases the isostatic strength of the honeycomb body by 15% or more. In some embodiments, the oxide slurry applied in step 210 increases the isostatic strength of the honeycomb body by 20% or more. In some embodiments, the oxide slurry applied in step 210 increases the isostatic strength of the honeycomb body by 30% or more. In some embodiments, the oxide slurry applied in step 210 increases the isostatic strength of the honeycomb body by 40% or more. In some embodiments, the oxide slurry increases the isostatic strength of the honeycomb body by 50% or more. In some embodiments, the oxide slurry increases the isostatic strength of the honeycomb body by 60% or more. In some embodiments, the oxide slurry applied in step 210 increases the isostatic strength of the honeycomb body by a percentage in the range of 15% to 100%, including subranges. For example, the oxide slurry applied in step 210 may increase the isostatic strength of the honeycomb body by 15%, 20%, 25%, 30%, 40%, 50%, 60%, 70%, 75%, 80%, 90%, or 100%, or within a range having any of these two percentages as endpoints.

These increases in isostatic strength are relative to the isostatic strength of the honeycomb body prior to application of the oxide slurry. Since an isostatic strength test evaluates the strength at failure for a honeycomb body, coated and un-coated honeycomb bodies made of the same material(s) and having the same dimensions can be tested for purposes of comparing the isostatic strengths.

In some embodiments, the isostatic strength of the honeycomb body after performing method 200 is 250 psi (about 1.7 Mpa) or more. In some embodiments, the isostatic strength of the honeycomb body after performing method 200 is 275 psi (about 1.9 Mpa) or more. In some embodiments, the isostatic strength of the honeycomb body after performing method 200 is 300 psi (about 2.1 Mpa) or more. In some embodiments, the isostatic strength of the honeycomb body after performing method 200 is in the range of 250 psi to 500 psi (about 1.7 Mpa to about 3.4 Mpa).

In some embodiments, the isostatic strength increases as a skin loading of the oxide particles deposited in step 210 increases. As used herein, "skin loading" means the amount of added oxide material present on the skin due to the oxide deposited on the skin after application and drying of the oxide slurry divided by the weight of the porous ceramic material of the skin prior to application of the oxide slurry, reported as a percentage. In other words, skin loading is defined by the following equation:

$$\frac{\text{wt. of oxide particles applied to the skin}}{\text{wt. of porous ceramic material of the skin}} \times 100$$

In some embodiments, the skin loading of the oxide particles is in the range of 10 wt. % (weight percent) to 50 wt. %, including subranges. For example, the skin loading may be 10 wt. %, 15 wt. %, 20 wt. %, 25 wt. %, 30 wt. %, 35 wt. %, 40 wt. %, 45 wt. %, or 50 wt. %, or within a range having any two of these values as endpoints. In some embodiments, the skin loading of the oxide particles is 30 wt. % or more.

In some embodiments, the oxide particles deposited in step 210 increase the density of the skin of the honeycomb body relative to the matrix of the honeycomb body such that the porous inorganic material defining the matrix of cells has a first density and the coated porous inorganic material of the skin has a second density greater than the first density of the matrix. In some embodiments, the porous inorganic material of the skin has a density that is 10% to 100% greater than the density of the porous inorganic material of the matrix of cells, including subranges. For example, the porous inorganic material of the skin may have a density that is 10%, 20%, 30%, 40%, 50%, 60%, 70%, 80%, 90%, or 100% greater than the density of the porous inorganic material of the matrix, or a density that is greater than the density of the porous inorganic material of the matrix defined by a range including any two these percentages as endpoints. In some embodiments, the density the porous inorganic material of the skin is 30% to 60% greater than the density of the porous inorganic material of the matrix.

For purposes of measuring the density of the skin and the density of the matrix, the density of a representative number of samples cut from the skin and from the matrix are measured and the average density value for skin samples and for the matrix samples, respectively, can be calculated. For purposes of comparing the density of the skin to the density of the matrix, hsamples from a peripheral region of cells (e.g., peripheral region 124 of cells) are not included.

In some embodiments, the density of the porous inorganic material of the skin is at least 10% greater than the density of the porous inorganic material of the matrix. In some embodiments, the density of the porous inorganic material of the skin is at least 20% greater than the density of the porous inorganic material of the matrix. In some embodiments, the density of the porous inorganic material of the skin is at least 30% greater than the density of the porous inorganic material of the matrix. In some embodiments, the density of the porous inorganic material of the skin is at least 40% greater than the density of the porous inorganic material of the matrix. In some embodiments, the density of the porous inorganic material of the skin is at least 50% greater than the density of the porous inorganic material of the matrix.

Figure 3:
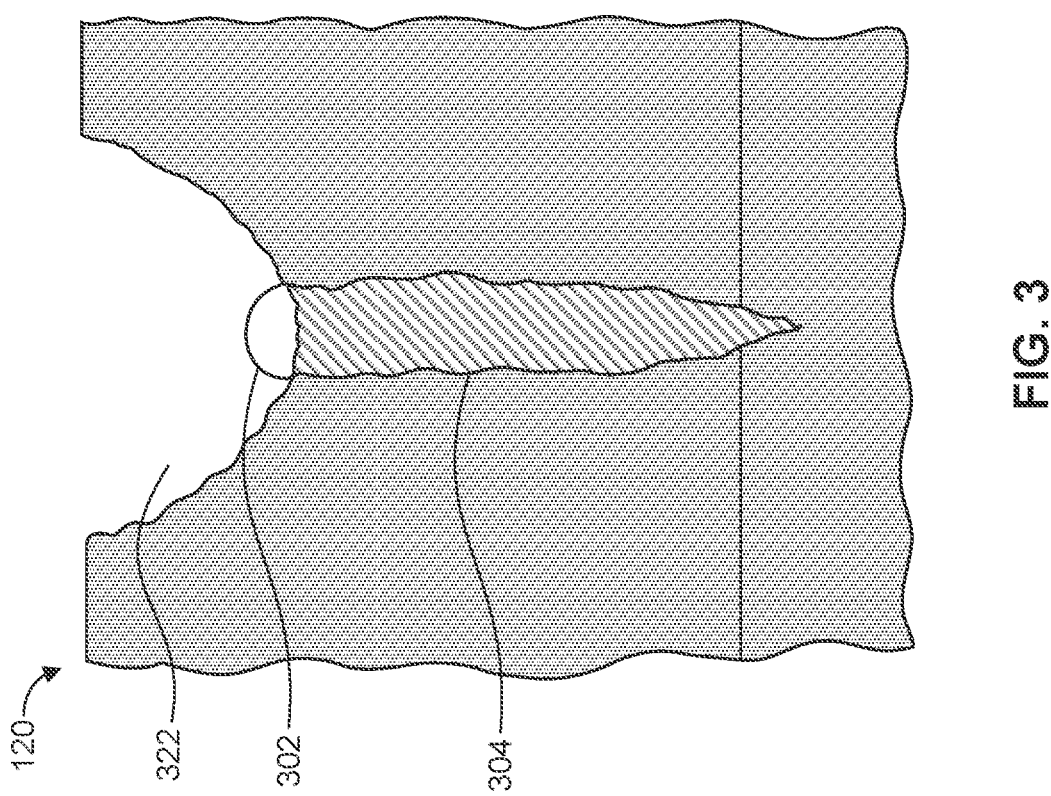
FIG. 3 illustrates a micro-crack in the skin of a honeycomb body according to some embodiments.

As discussed above, a ceramic honeycomb body, for example honeycomb body 100, can comprise a plurality of micro-cracks 304 in the skin, as shown in FIG. 3. For example, skin 120 can comprise a plurality of pores, for example pore 322, in its surface. Some pores may comprise micro-cracks, for example micro-crack 304, extending from the base of the pore 304.

A gel formed, for example gel or gel bead 302, by the reaction between the buffer solution and the oxide slurry forms as a bead at the entrance to the micro-crack, for example micro-crack 304. This gel bead 302 impedes the oxide slurry from entering the micro-crack, thereby preventing oxide particles from being deposited in the corresponding micro-crack. Accordingly, micro-cracks within the skin of a honeycomb body may close during heating of the honeycomb body to accommodate for thermal expansion of the material of the skin, thereby preventing significant increases in CTE from occurring. For example, in some embodiments, coating the skin in step 210 causes the CTE from room temperature (RT) to 800° C. of the skin to increase by no more than two and a half times, preferably no more than double, and even more preferably no more than 50%, or even no more than 25%. Unless stated otherwise, CTE values discussed herein are measured using the thermal mechanical analysis method of ASTM E228 ("Standard Test Method for Linear Thermal Expansion of Solid Materials With a Push-Rod Dilatometer"). For CTE tests described herein, the CTE over a temperature range of approximately 23° C. to 1000° C. was measured. A heating rate of 10° C./minute up to 1000° C. was used. Samples were held at 1000° C. for 5 minutes and then cooled to 23° C. at a 20° C./minute cooling rate. While data from 0 to 1000 was measured, CTE values are provided from room temperature (approximately 23° C.-25° C.) to 800° C. Accordingly, FIGS. 5-11 show only the data from about 0° C. to 800° C.

Figure 4A:
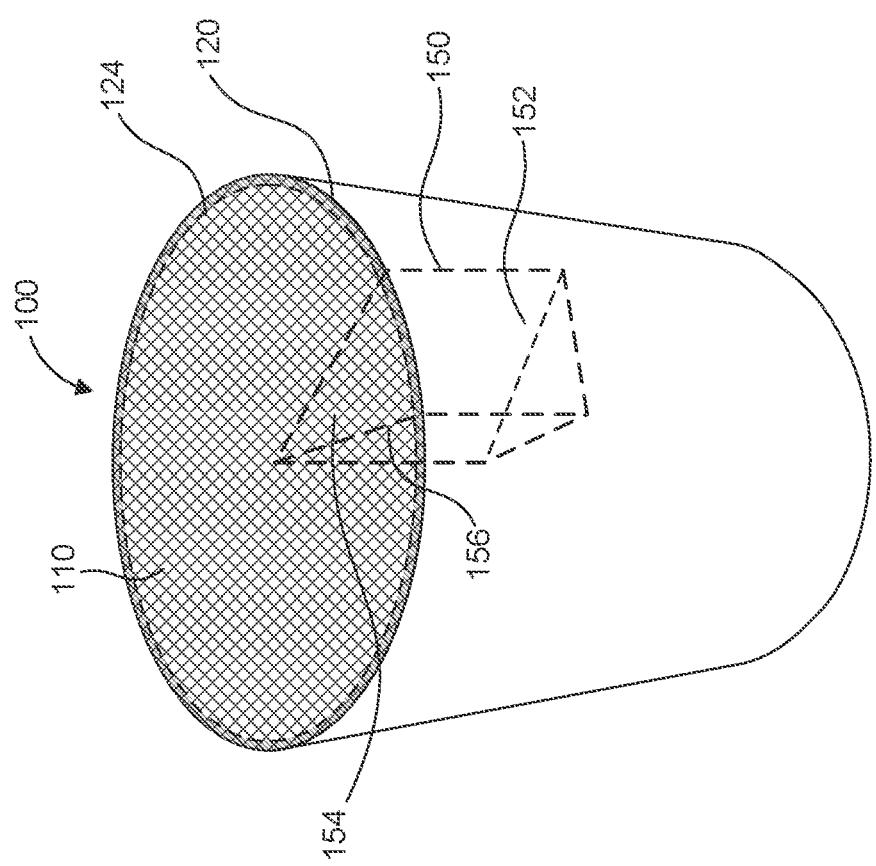
FIG. 4A illustrates a top perspective view of a honeycomb body and a pie-shaped test sample of a honeycomb body.
Figure 4B:
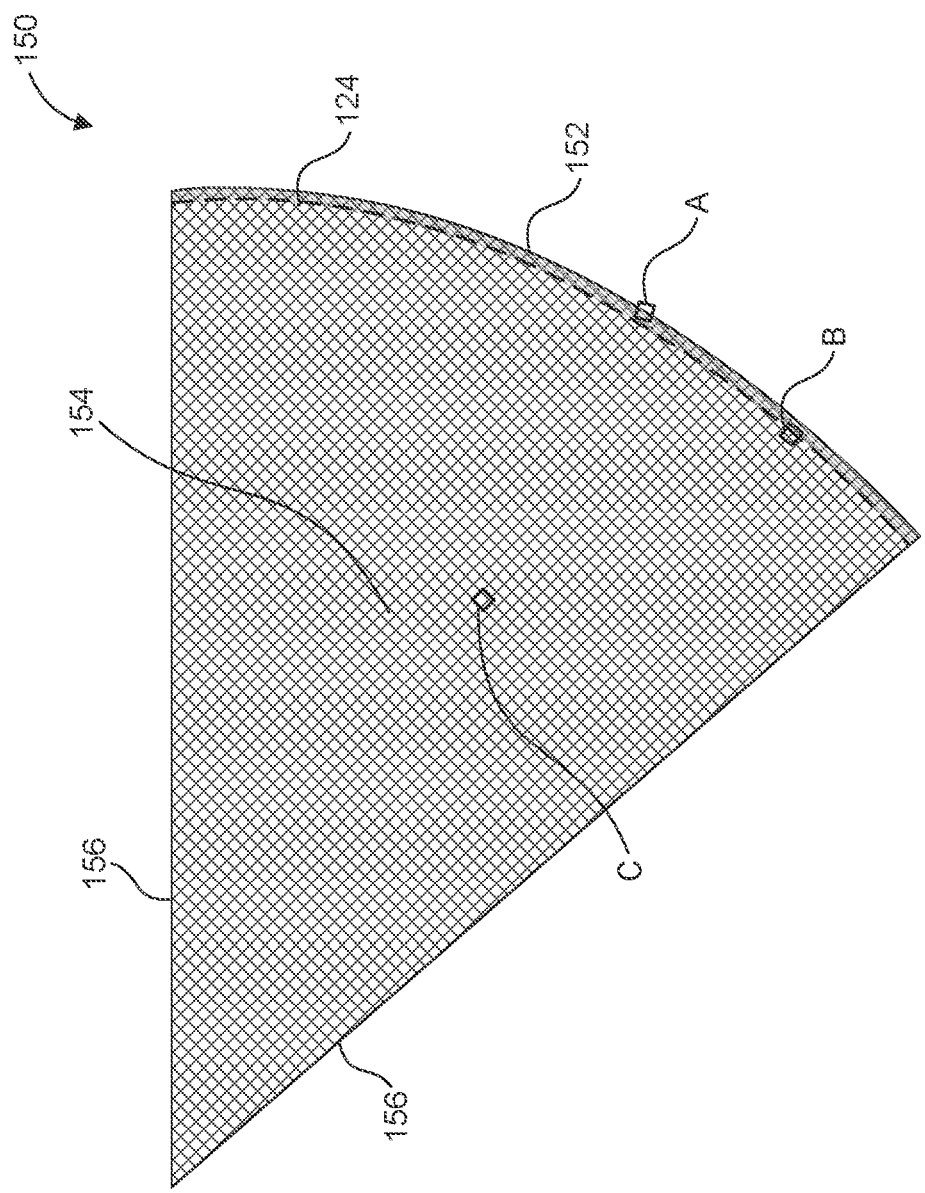
FIG. 4B is a top view of the pie-shaped test sample of FIG. 4A.

In order to test the properties of honeycomb bodies, for example honeycomb body 100, treated with various surface treatments, various full honeycomb body samples and various pie-shaped samples 150, for example, as shown in FIGS. 4A and 4B, were tested. The pie-shaped samples were cut from various cylindrical honeycomb bodies comprising a predominately aluminum titanate (AT) ceramic material. Each uncut honeycomb body had a diameter of about 163 mm (6.42 inches) and a height of about 193 mm (7.6 inches). Pie-shaped samples 150 each had a height of about 95 mm, a width of about 64 mm, and a surface area of about 60 cm². The honeycomb bodies from which the samples were taken were made of a porous ceramic material having a CTE of about $8.4 \times 10^{-7}$ measured from RT to 800° C. Pie-shaped samples 150 comprise a skin portion 152, a matrix portion 154, and two skinless edges 156. After being cut, the pie-shaped samples were cleaned of debris, dried in an oven at 100° C. for 2 hours, cooled to room temperature, and then were weighed.

Prior to cutting the pie-shaped samples, some uncut honeycomb bodies were weighed to determine a dry weight, and then coated with an oxide slurry. This coating was performed using a paintbrush. After coating, the samples were dried in an oven at 70° C. for two to four hours before coating again with a second coat of the oxide slurry. Additional uncut honeycomb bodies were weighed, a buffer solution was applied to the skin of the honeycomb bodies, and then the skin was coated with an oxide slurry. These buffer solutions and oxide slurry coatings were applied using a paintbrush. These samples were dried two times. They were dried after the buffer solution was applied and before coating with the oxide slurry. They were also dried after coating of the oxide slurry.

The oxide slurries disclosed herein include NYACOL® AL-20 colloidal alumina with about 20 wt. % alumina, DISPAL®-14N-480, dispersed in Di-water, and silica soot with about 20 wt. % silica. In the Tables below, NYACOL® AL-20 is abbreviated as "AL-20", DISPAL®-14N-480 dispersed in Di-water is abbreviated as "Dispal-20," and silica soot with about 20 wt. % silica is abbreviated as "Silica Soot." All of the coated samples were weighed a second time after all coatings were applied and the samples were dried.

Dried, coated samples, as well as samples of untreated honeycomb bodies (control samples shown in Table 1) were tested for isostatic strength using a strength testing apparatus. A "control" sample is a honeycomb body that is not treated with a buffer or an oxide slurry as described herein. In other words, the "control" samples have no oxide coating or buffer materials applied to the porous ceramic material(s) of the honeycomb body. Since the isostatic strength of any given sample can vary, Table 1 also shows an average isostatic strength for the control samples. As shown in Tables 1 and 2, below, samples 6-15, which were coated with various buffers and oxide slurries, generally had higher isostatic strengths than the control samples 1-5, and all had higher isostatic strengths than the average for the control samples.

For Table 2, the full size honeycomb body samples had an average diameter of 6.4 inches and length of 7.6 inches. Both initial weight and final oxide coated weight were measured. The samples had an average skin thickness of 1.27 mm, a 55% porosity, and material density of 2.5 g/cm³. The estimated skin loading is the ratio of oxide loading on the skin to calculated skin weight (~141.5 g), assuming skin thickness of 1.27 mm, porosity of 55%, and material density of 2.5 g/cm³.

The "5 Buffer" in the tables is a buffer having a pH value around 5.3. This buffer was prepared by mixing 50 grams of pH-4-buffer solution from Fischer Scientific and 50 grams of pH-7 buffer solution from Fischer Scientific. The "10 Buffer" is a pH 10 buffer solution from Fischer Scientific. The "7-50-50-Buffer" is a buffer solution made of 50 grams of pH-7 buffer from Fischer Scientific and 50 grams of DI water.

TABLE 1

| Sample Number | Sample Type | Diameter (in) | Length (in) | Isostatic Strength (psi) |
|---|---|---|---|---|
| 1 | Control | 6.42 | 7.6 | 152 |
| 2 | Control | 6.42 | 7.6 | 190 |
| 3 | Control | 6.42 | 7.6 | 222 |
| 4 | Control | 6.42 | 7.6 | 170 |
| 5 | Control | 6.42 | 7.6 | 175 |
| | | | Average: | 182 |

TABLE 2

| Sample Number | Buffer and Oxide Slurry Materials | Initial Weight (g) | Final Dry Weight (g) | Isostatic Strength (psi) | Oxide Loading on Skin (g) | Estimated Skin Loading (wt. %) |
|---|---|---|---|---|---|---|
| 6 | 5 Buffer and AL-20 | 2207.76 | 2262 | 255 | 54.24 | 38.32 |
| 7 | 5 Buffer and AL-20 | 2192.4 | 2264.93 | 289 | 72.53 | 51.24 |
| 8 | 5 Buffer and AL-20 | 2269.8 | 2339.49 | 409 | 69.69 | 49.24 |
| 9 | 5 Buffer and AL-20 | 2194.28 | 2265.63 | 270 | 71.35 | 50.41 |
| 10 | 5 Buffer and AL-20 | 2190.55 | 2263.7 | 325 | 73.15 | 51.68 |
| 11 | 20 wt. % Silica Soot slurry with 0.2 wt. % NaOH Buffer | 2195.59 | 2249.24 | 236 | 53.65 | 37.90 |
| 12 | 20 wt. % Silica Soot slurry with 0.2 wt. % NaOH Buffer | 2256.18 | 2315.11 | 296 | 58.93 | 41.63 |
| 13 | 20 wt. % Silica Soot slurry with 0.2 wt. % NaOH Buffer | 2193.93 | 2255.76 | 267 | 61.83 | 43.68 |
| 14 | 20 wt. % Silica Soot slurry with 0.2 wt. % NaOH Buffer | 2207.09 | 2265.84 | 224 | 58.75 | 41.51 |
| 15 | 20 wt. % Silica Soot slurry with 0.2 wt. % NaOH Buffer | 2198.3 | 2255.3 | 212 | 57 | 40.27 |

Next, to evaluate the effect of different buffer and/or oxide slurry treatments on the CTE of a honeycomb body, smaller samples were cut from pie-shaped samples. These smaller samples were tested to evaluate CTE values in different regions of the honeycomb bodies. As shown for example in FIG. 4B, these smaller samples were cut from three regions of the honeycomb bodies: (1) a skin region (region A, referred to herein as "skin region"), (2) an edge of the matrix adjacent the skin in the peripheral region of cells (region B, referred to herein as "edge region"), and (3) a middle region of the matrix (region C, referred to herein as "matrix region"). CTE values were measured using the thermal mechanical analysis method of ASTM E228, from 0° C. to 1000° C. in an oven, at a rate of 10° C./minute.

Table 3, below, shows the CTE values at 800° C. for skin region samples of honeycomb bodies coated only with oxide slurries. Similarly, Table 4, below, shows the CTE values at 800° C. for skin region samples of honeycomb bodies treated with various buffer solution and oxide slurry combinations.

TABLE 3

| Oxide Slurry Materials | Sample No. | Length (mm) | Width (mm) | Area (cm²) | Initial Weight (g) | Final Weight (g) | CTE RT-800° C. Heating (×10⁻⁷) |
|---|---|---|---|---|---|---|---|
| AL-20 | 16 | 96.84 | 63.5 | 61.493 | 137.26 | 141.35 | 28.95 |
| Dispal-20 | 17 | 95.05 | 63.5 | 60.357 | 131.66 | 135.17 | 22.36 |
| Dispal-20 | 18 | 96.14 | 61.93 | 59.54 | 131.66 | 136.57 | 26.15 |
| Silica Soot | 19 | 91.71 | 61.93 | 56.796 | 121 | 128.81 | 26.98 |
| Silica Soot | 20 | 94.52 | 60.32 | 57.014 | 138.95 | 143.5 | 27.86 |

TABLE 4

| Oxide Slurry and Buffer Materials | Sample No. | Length (mm) | Width (mm) | Area (cm²) | Initial Weight (g) | 1st Dry weight (g) | CTE RT-800° C. Heating (×10⁻⁷) |
|---|---|---|---|---|---|---|---|
| 10 Buffer and AL-20 | 21 | 94.74 | 63.5 | 60.16 | 130.42 | 131.39 | 9.72 |
| 7-50-50 Buffer and Dispal-20 | 22 | 97.54 | 65.08 | 63.479 | 139.03 | 139.4 | 8.96 |
| 7-50-50 Buffer and Dispal-20 | 23 | 96.11 | 63.5 | 61.03 | 134.73 | 136.58 | 13.84 |
| 7-50-50 Buffer and AL-20 | 24 | 96.02 | 63.5 | 60.973 | 133.33 | 136.7 | 14.83 |

As shown in Tables 3 and 4, the samples treated with a buffer solution had significantly lower CTE values than the samples treated solely with an oxide slurry. That is, the CTE values for the samples that received the oxide slurry without the buffer (Table 3) increased at a minimum over two and a half times the starting CTE value, while the CTE increases of the samples treated with both the buffer and the oxide slurry (Table 4) were less than double, with some even less than a 25% increase, with respect to the initial CTE value of $8.4 \times 10^{-7}$ from RT to 800° C. It is believed that this is due to the gel formed by the precipitation reaction between the buffer solution and the oxide slurry, which prevents the oxide slurry from entering micro-cracks present within the skin of the honeycomb bodies.

FIGS. 5-11 are plots illustrating thermal expansion as a function of temperature for regions A, B, and C of various pie-shaped samples. These plots further demonstrate the ability of treatment methods according to embodiments described herein to control the CTE of a honeycomb body's skin. In FIGS. 5-11, "ppm" means parts per million ($10^{-6}$). A CTE from 25° C. (room temperature) to X° C. in ppm is calculated using the following equation: [(Delta L/L)@X° C.−(Delta L/L)@25° C.]/[X-25].

Figure 5:
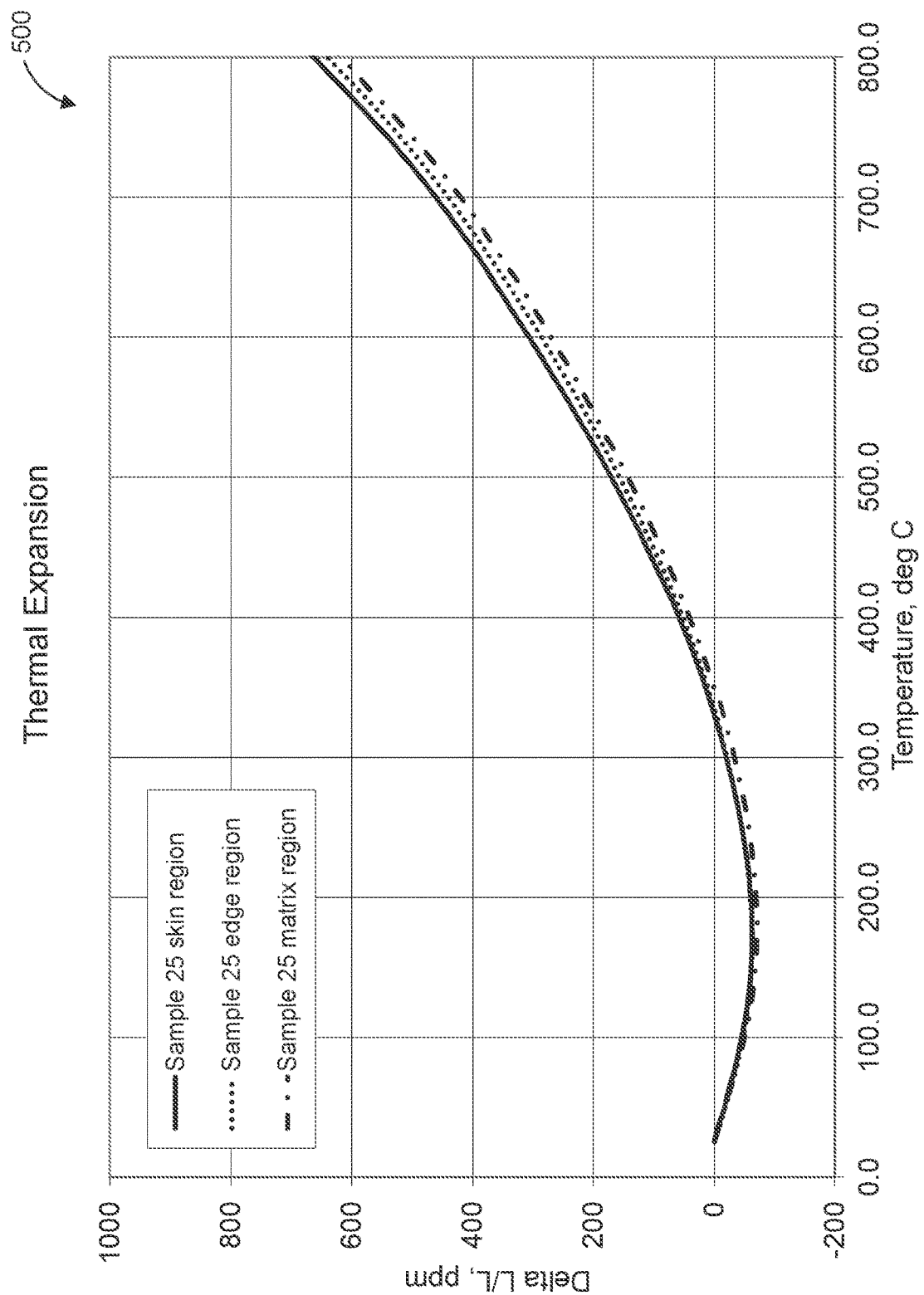
FIG. 5 is a plot comparing the thermal expansion as a function of temperature for various portions of a test sample of a honeycomb body.

FIG. 5 shows a plot 500 illustrating the changes in thermal expansion for an skin region sample, an edge region sample, and a matrix region sample of a pie-shaped sample of an untreated honeycomb body (sample 25 in Table 5 below) as a function of temperature. The regions tested were not treated with either a buffer solution or an oxide slurry. As shown in plot 500, the thermal expansion values of the skin region, edge region, and matrix region of the sample followed nearly the exact same path during heating. This similarity is due to the uniformity of the ceramic material, since none of the regions were coated with a buffer or an oxide slurry.

TABLE 5

| Sample | Buffer Solution | Oxide Slurry Material | Approximate Added Oxide Weight on Skin of Sample (g) |
|---|---|---|---|
| 25 | None | none | n/a |
| 26 | None | AL-20 | 3.4 |
| 27 | None | AL-20 | 4 |
| 28 | None | Dispal-20 | 3.5 |
| 29 | None | Dispal-20 | 5 |
| 30 | 7 Buffer | AL-20 | 3.4 |
| 31 | 7 Buffer | Dispal-20 | 1.9 |
| 32 | 5 Buffer | AL-20 | 3.8 |
| 33 | 5 Buffer | Dispal-20 | 6.4 |
| 34 | 10 Buffer | AL-20 | 1 |
| 35 | 10 Buffer | Dispal-20 | 0.4 |

Figure 6:
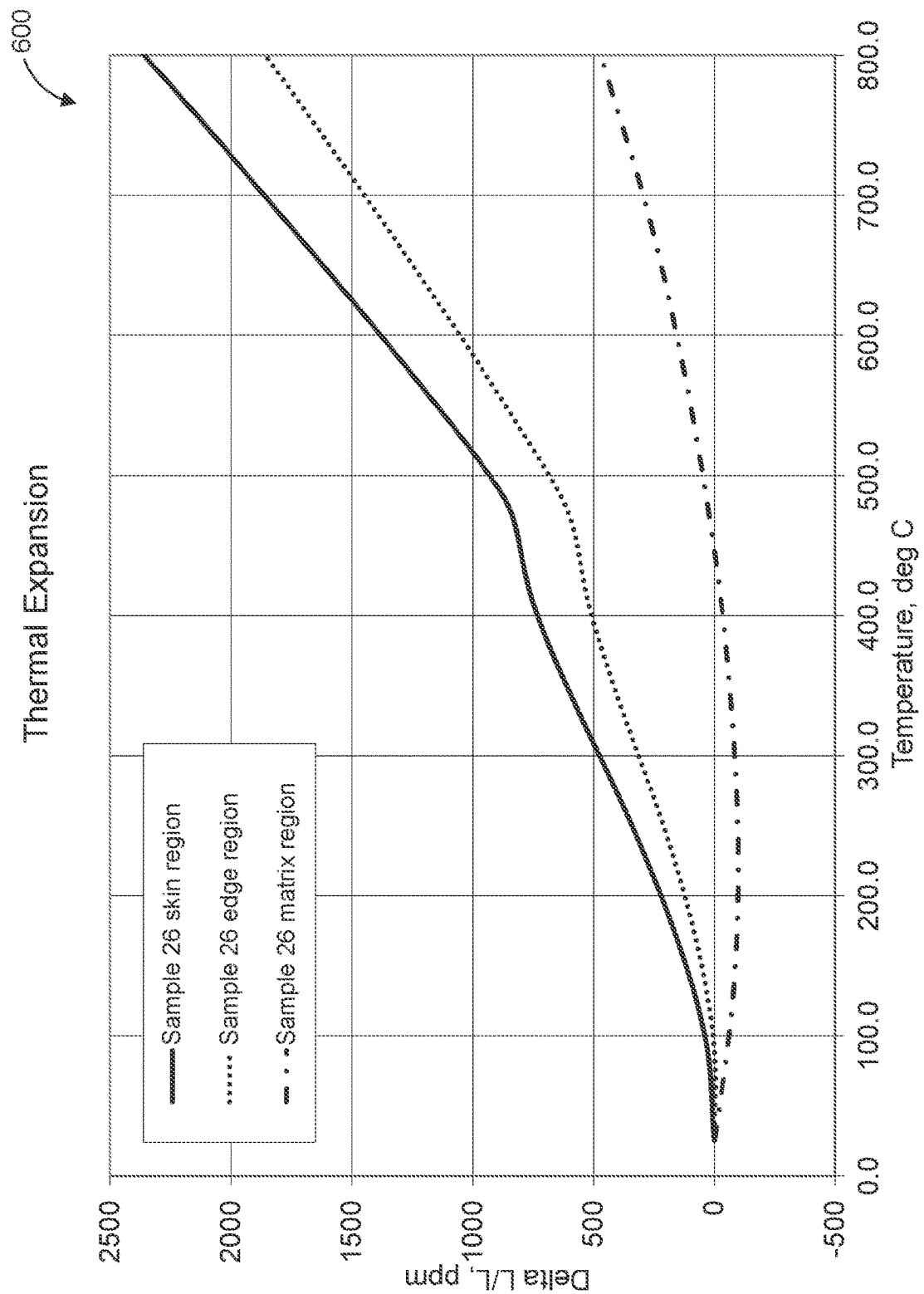
FIG. 6 is a plot comparing the thermal expansion as a function of temperature for various test samples of a honeycomb body.

As illustrated in plot 600 shown in FIG. 6, for example, when an oxide slurry was applied to the skin of the honeycomb body with no buffer applied first, the thermal expansion of the skin was significantly higher in the treated skin region than in the untreated matrix region. Plot 600 shows thermal expansion heating curves for an skin region sample, an edge region sample, and a matrix region sample treated honeycomb body sample 26 in Table 5. Only the skin of honeycomb body sample 26 was treated according to the methods described herein with an AL-20 oxide slurry, which resulted in approximately 3.4 grams of alumina loading on the skin of the pie-shaped sample. As demonstrated by the data shown in plot 600, the thermal expansion of the skin was much higher during heating than the thermal expansion of the untreated matrix portion, which had thermal expansion values consistent with those of the untreated honeycomb body represented by plot 500. It is believed that this difference in thermal expansion is caused by deposits of the oxide slurry within micro-cracks present in the porous ceramic material of the skin of the honeycomb body. Furthermore, the data shown in plot 600 demonstrates the effect of the oxide slurry seeping into a peripheral region of cells of a matrix, for example peripheral region 124 of cells. As shown, the edge region sample had a much higher thermal expansion at 800° C. than the matrix sample. It is believed that this is due to the presence of oxide particles within micro-cracks present in the porous cell walls of cell located in the peripheral region of cells.

Figure 7:
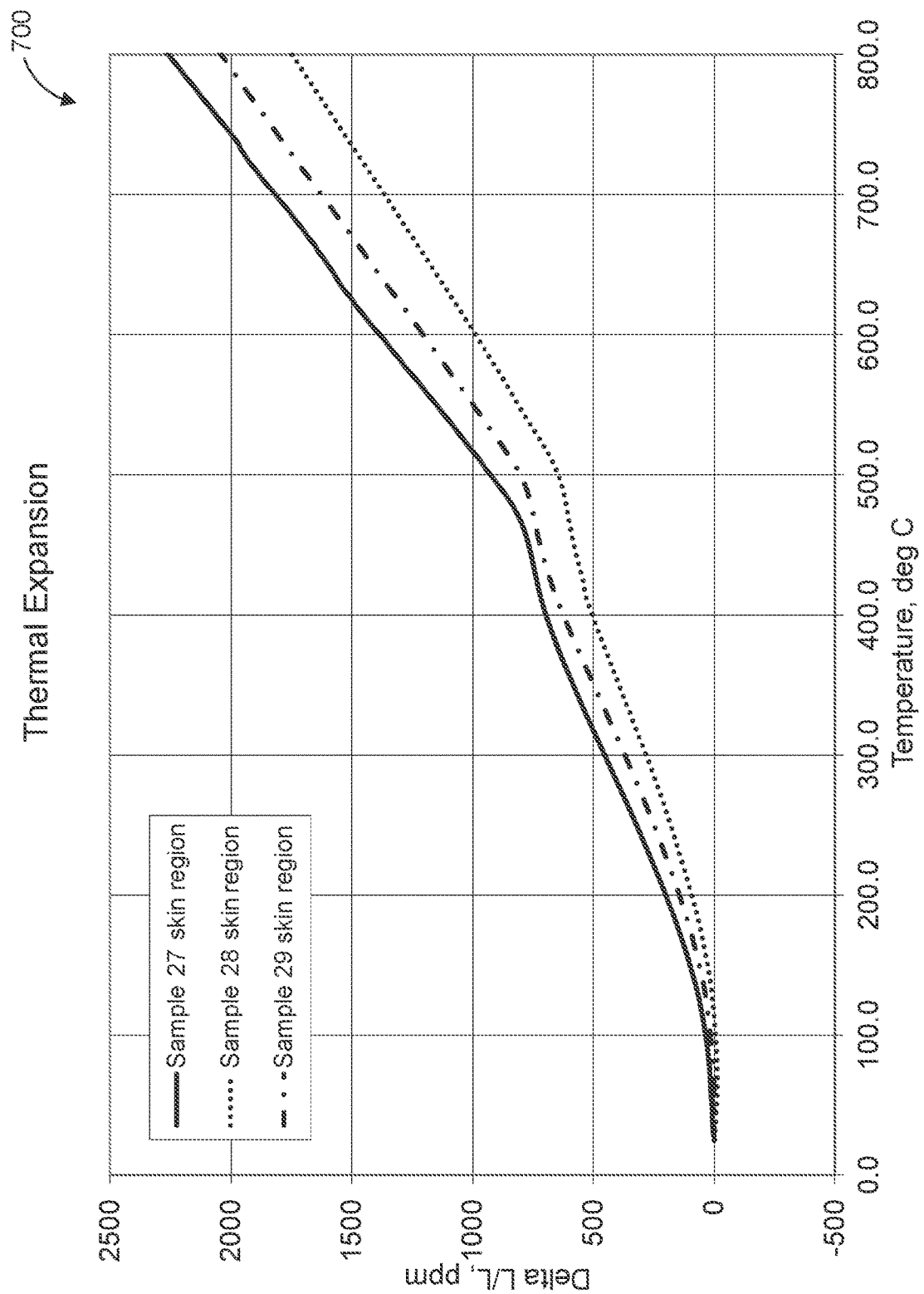
FIG. 7 is a plot comparing the thermal expansion as a function of temperature for various test samples of a honeycomb body.

FIG. 7 is a plot 700 showing heating curves for skin region samples of test samples 27, 28, and 29, shown in Table 5. Similar to the samples shown in plot 600, each of these samples shown in plot 700, had an oxide slurry applied directly to the skin of a honeycomb body without buffer solution first being applied. Samples 28 and 29 were coated with Dispal-20 oxide slurries, while sample 27 was coated with an AL-20 oxide slurry. Samples 28 and 29 had slightly lower thermal expansion values at 800° C. than sample 27. This suggests that Dispal-20 oxide slurries cause a smaller thermal expansion increase than AL-20 oxide slurries. Additionally, sample 28 had the lowest thermal expansion values, which is likely because sample 28 had only about 3.5 grams of oxide slurry loading on the skin, while sample 27 had about 4 grams of oxide slurry loading, and sample 29 had about 5 grams of oxide slurry loading. Accordingly, the data shown in plot 700 demonstrates that when a greater amount of oxide particles are deposited on and within the skin, the thermal expansion of the skin can be higher.

Figure 8:
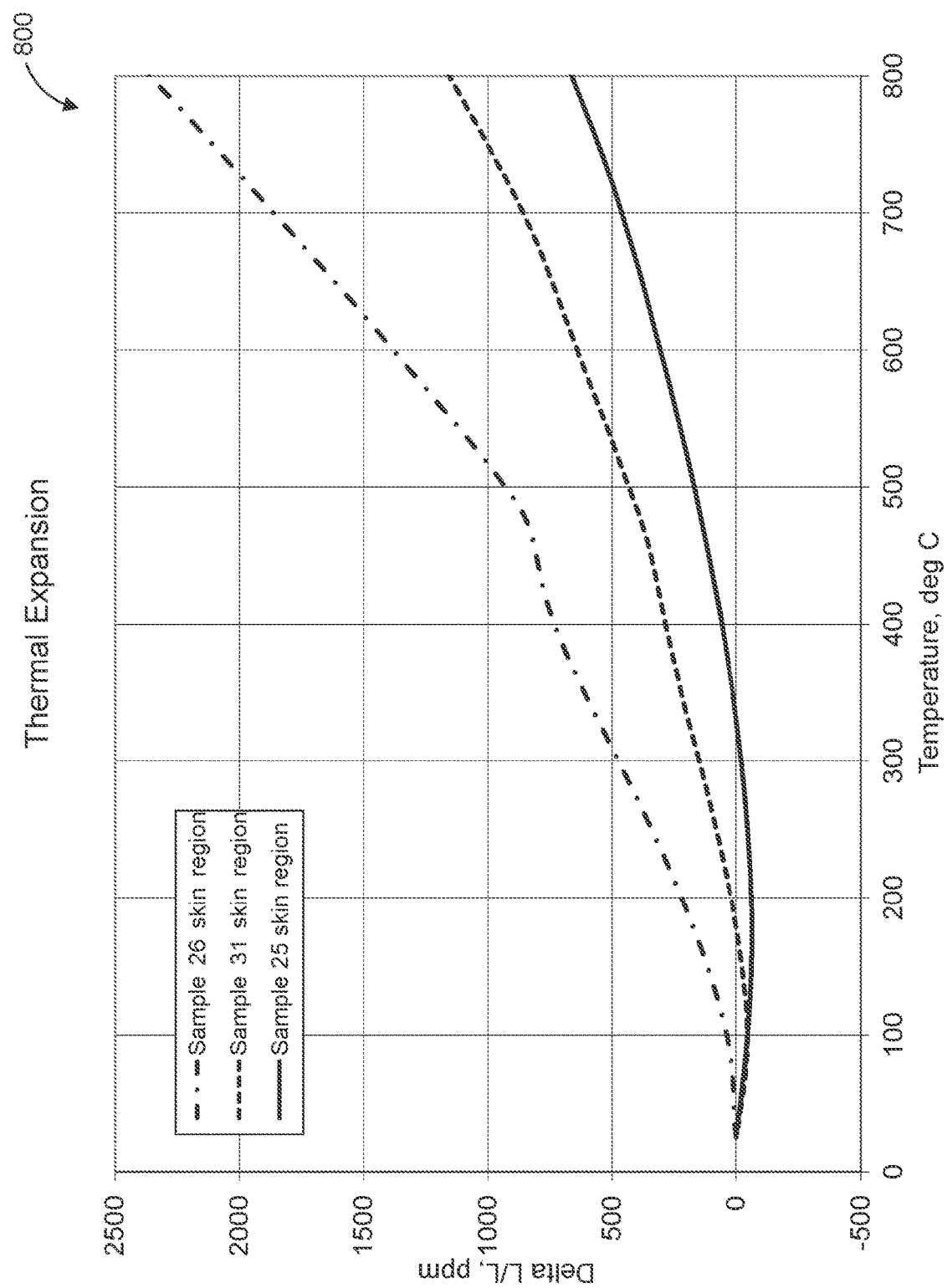
FIG. 8 is a plot comparing the thermal expansion as a function of temperature for various test samples of a honeycomb body.
Figure 9:
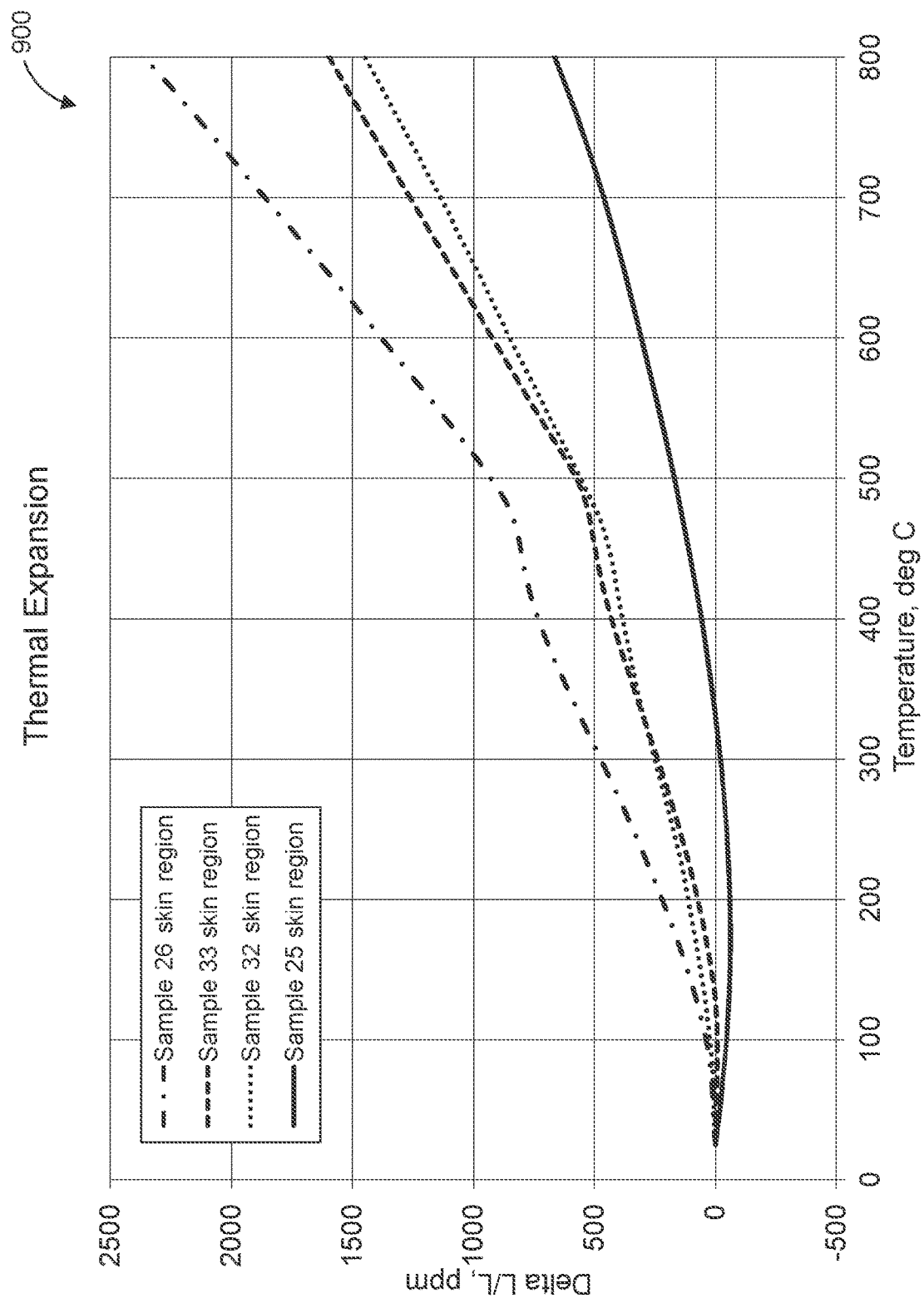
FIG. 9 is a plot comparing the thermal expansion as a function of temperature for various test samples of a honeycomb body.
Figure 10:
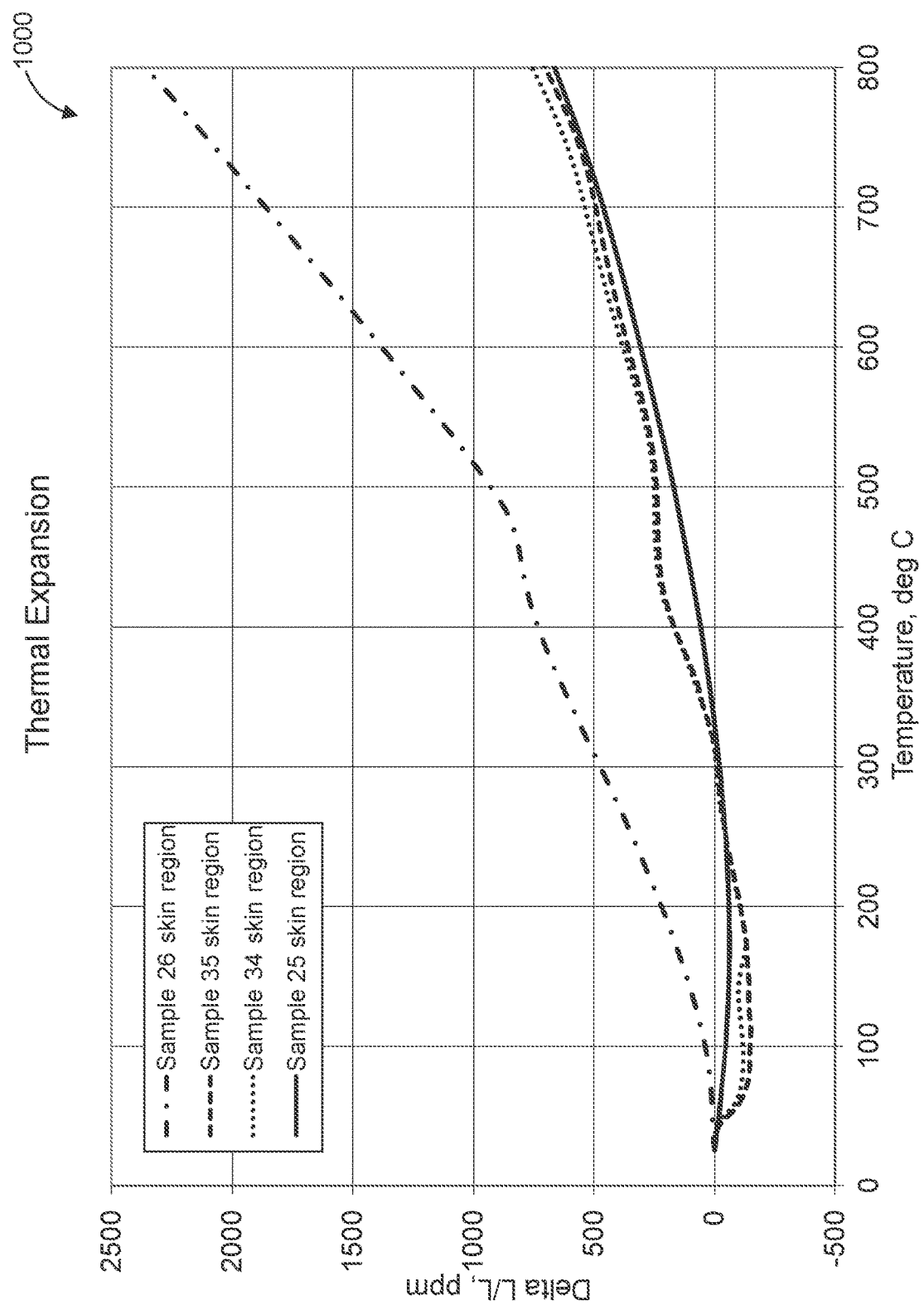
FIG. 10 is a plot comparing the thermal expansion as a function of temperature for various test samples of a honeycomb body.

As shown in plots 800, 900, and 1000 of FIGS. 8-10, samples 31-35 treated with a buffer solution and an oxide slurry had thermal expansion values much closer to that of untreated sample 25 than that of sample 26. Additionally, samples 34 and 35, shown in plot 1000 had the closest thermal expansion values to that of untreated sample 25. It is believed that samples 34 and 35 were able to achieve such low thermal expansion values because they had significantly lower alumina skin loading values due to the precipitation reaction between the 10 buffer and the oxide slurry materials formed a strong gel at the contact interface between the buffer and the oxide slurry. As described herein, this precipitation region prevented more oxide particles from entering micro-cracks within the skin than samples 32 and 33 shown in plot 900.

Figure 11:
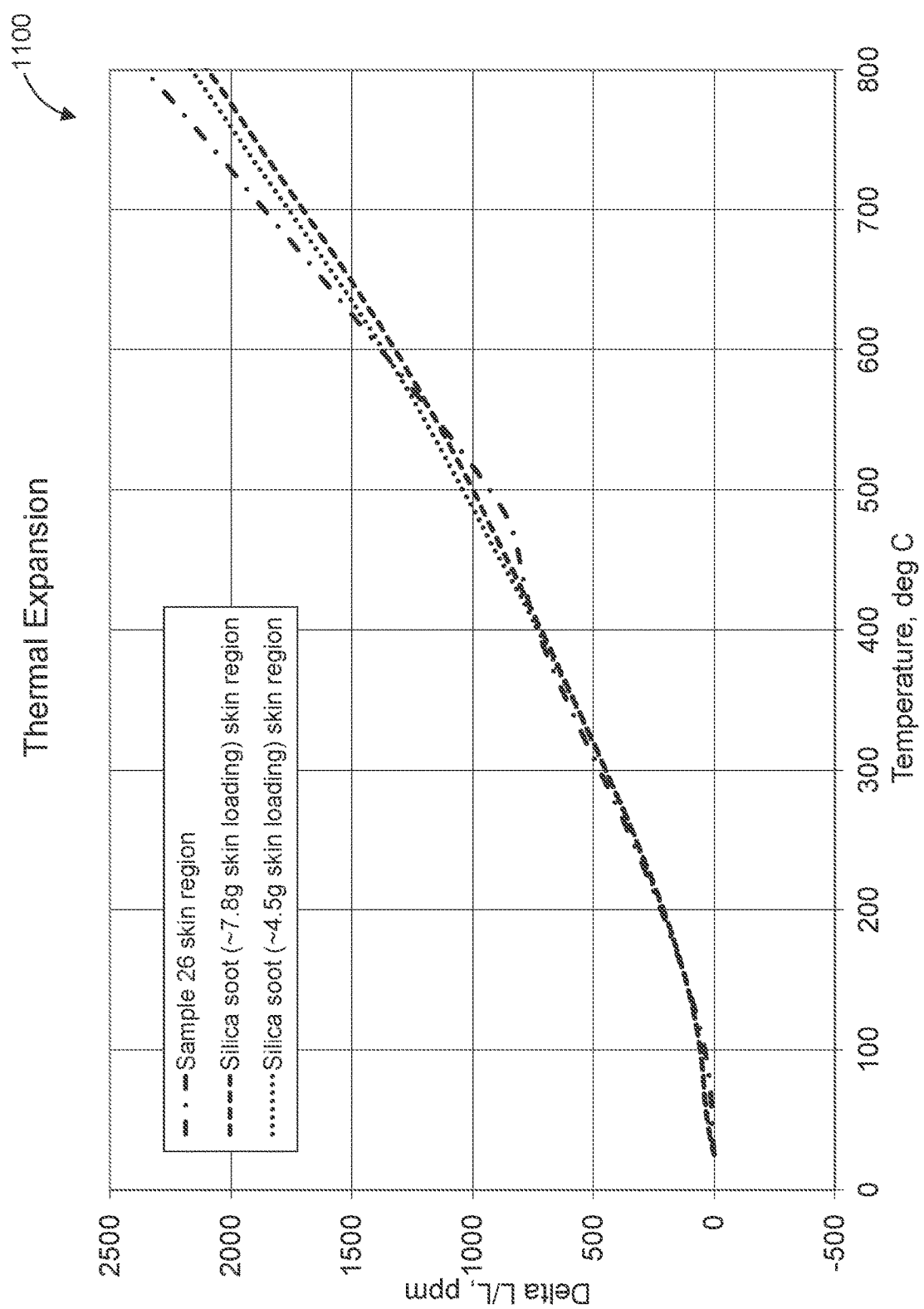
FIG. 11 is a plot comparing the thermal expansion as a function of temperature for various test samples of a honeycomb body.

FIG. 11 shows a plot 1100 illustrating the changes in thermal expansion of two different pie-shaped samples, each treated with a silica soot oxide slurry, as a function of temperature. Neither sample was treated with a buffer solution. Also shown on plot 1100 is the heating curve for sample 26, described above, for comparison purposes. As shown, the thermal expansion values for the samples treated with the silica soot oxide slurries are very similar to that of sample 26, and accordingly are much greater than the thermal expansion values of untreated sample 25. The data shown in plot 1100 demonstrates the tendency of oxide particles in an oxide slurry applied to the skin of a honeycomb body to deposit into micro-cracks of the ceramic material if no buffer solution is applied prior to the application of the oxide slurry.

While various embodiments have been described herein, they have been presented by way of example, and not limitation. It should be apparent that adaptations and modifications are intended to be within the meaning and range of equivalents of the disclosed embodiments, based on the teaching and guidance presented herein. It therefore will be apparent to one skilled in the art that various changes in form and detail can be made to the embodiments disclosed herein without departing from the spirit and scope of the present disclosure. The elements of the embodiments presented herein are not necessarily mutually exclusive, but may be interchanged to meet various situations as would be appreciated by one of skill in the art.

Embodiments of the present disclosure are described in detail herein with reference to embodiments thereof as illustrated in the accompanying drawings, in which like reference numerals are used to indicate identical or functionally similar elements. References to "one embodiment," "an embodiment," "some embodiments," "in certain embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The examples are illustrative, but not limiting, of the present disclosure. Other suitable modifications and adaptations of the variety of conditions and parameters normally encountered in the field, and which would be apparent to those skilled in the art, are within the spirit and scope of the disclosure.

The indefinite articles "a" and "an" to describe an element or component means that one or at least one of these elements or components is present. Although these articles are conventionally employed to signify that the modified noun is a singular noun, as used herein the articles "a" and "an" also include the plural, unless otherwise stated in specific instances. Similarly, the definite article "the," as used herein, also signifies that the modified noun may be singular or plural, again unless otherwise stated in specific instances.

Where a range of numerical values is recited herein, comprising upper and lower values, unless otherwise stated in specific circumstances, the range is intended to include the endpoints thereof, and all integers and fractions within the range. It is not intended that the scope of the claims be limited to the specific values recited when defining a range. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed. Finally, when the term "about" is used in describing a value or an end-point of a range, the disclosure should be understood to include the specific value or end-point referred to. Whether or not a numerical value or end-point of a range recites "about," the numerical value or end-point of a range is intended to include two embodiments: one modified by "about," and one not modified by "about."

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art.

The present embodiment(s) have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

It is to be understood that the phraseology or terminology used herein is for the purpose of description and not of limitation. The breadth and scope of the present disclosure should not be limited by any of the above-described exemplary embodiments, but should be defined in accordance with the following claims and their equivalents.

What is claimed is:

1. A method for treating a honeycomb body, the honeycomb body comprising a skin surrounding a matrix of cells defined by a plurality of intersecting walls, the method comprising:
    applying a buffer solution to an exterior surface of the skin, the buffer solution comprising a first pH, wherein a porous inorganic material of the skin comprises a plurality of micro-cracks, and wherein applying the buffer solution to the skin comprises introducing the buffer solution into the plurality of micro-cracks, wherein the buffer solution comprises one or more of: ammonium chloride, ammonium nitrate, ammonium acetate, ammonium hydroxide, potassium phosphate, sodium hydroxide, boric acid, potassium chloride, sodium chloride, potassium carbonate, potassium borate, potassium hydroxide, hydrochloric acid, or potassium acid phthalate; and
    coating the exterior surface of the skin with an oxide slurry and depositing inorganic particles of the oxide slurry in pores of the porous inorganic material of the skin to increase a first density of the skin relative to a second density of a porous inorganic material of the matrix, the inorganic particles comprising particles of an oxide or a precursor of the oxide, wherein the oxide comprises alumina, silica, titania, zirconia, ceria, or aluminum silicate;
    wherein the density of the skin after coating is 30% to 60% greater than a density of the porous inorganic material of the matrix,
    wherein the oxide slurry comprises a second pH different from the first pH, and
    wherein the oxide slurry and the buffer solution form a gel that inhibits the inorganic particles of the oxide or the precursor of the oxide from entering the plurality of micro-cracks.

2. The method of claim 1, wherein applying the buffer solution to the skin of the honeycomb comprises applying the buffer solution to only the skin of the honeycomb body and wherein coating the skin comprises applying the oxide slurry to only the skin of the honeycomb body.

3. The method of claim 1, wherein the oxide slurry seeps into at least some of the intersecting walls of peripheral cells in the matrix of cells.

4. The method of claim 1, wherein a precipitation reaction occurs at a contact interface between the buffer solution and the oxide slurry to cause agglomeration of the inorganic particles of the oxide slurry.

5. The method of claim 1, further comprising, after coating the skin with the oxide slurry, applying a washcoat slurry comprising a catalytic material to at least the intersecting walls of the honeycomb body, wherein the catalytic material comprises platinum, palladium, or rhodium, or alloys thereof.

6. The method of claim 5, wherein the porous inorganic material of the skin is cordierite, and inorganic particles comprise cordierite or a cordierite precursor.

7. The method of claim 1, wherein the buffer solution is an aqueous solution.

8. The method of claim 1, wherein the oxide slurry comprises colloidal alumina.

9. The method of claim 1, wherein the oxide slurry comprises nano-particle silica soot.

10. The method of claim 1, wherein the oxide slurry comprises colloidal titania, colloidal zirconia, or colloidal ceria.

11. The method of claim 1, wherein the oxide slurry comprises colloidal aluminum silicate.

12. The method of claim 1, wherein the method increases the coefficient of thermal expansion of the skin measured at 800° C. by no more than two and a half times.

13. The method of claim 1, wherein the method increases the isostatic strength of the honeycomb body by 15% or more.

14. The method of claim 1, wherein after the drying step, the honeycomb body comprises a skin loading of 10 wt. % to 50 wt. %, wherein the skin loading in percent is the ratio of the weight of oxide particles applied to the skin divided by the weight of the porous ceramic material of the skin, times 100.

15. The method of claim 1, wherein after the drying step, the honeycomb body comprises a skin loading of 30 wt. % to 50 wt. %, wherein the skin loading in percent is the ratio of the weight of oxide particles applied to the skin divided by the weight of the porous ceramic material of the skin, times 100.

16. A method for treating a honeycomb body, the honeycomb body comprising a skin surrounding a matrix of cells defined by a plurality of intersecting wall, the method comprising:
  applying a buffer solution to only an exterior surface of the skin, wherein the buffer solution is an aqueous solution comprising one or more of: ammonium chloride, ammonium nitrate, ammonium acetate, ammonium hydroxide, potassium phosphate, sodium hydroxide, boric acid, potassium chloride, sodium chloride, potassium carbonate, potassium borate, potassium hydroxide, hydrochloric acid, or potassium acid phthalate;
  coating the exterior surface of the skin with an oxide slurry, the oxide slurry comprising an oxide or a precursor of the oxide to deposit inorganic particles in pores of a porous material of the skin, wherein the oxide comprises alumina, silica, Mania, zirconia, ceria, or aluminum silicate; and
  drying the honeycomb body,
  wherein the method increases an isostatic strength of the honeycomb body by 40% or more relative to an isostatic strength of the honeycomb body prior to application of the oxide slurry.

17. A method for treating a honeycomb body, the honeycomb body comprising a skin surrounding a matrix of cells defined by a plurality of intersecting walls, the method comprising:
  applying a buffer solution to an exterior surface of the skin, the buffer solution comprising a first pH, wherein a porous inorganic material of the skin comprises a plurality of micro-cracks, and wherein applying the buffer solution to the skin comprises introducing the buffer solution into the plurality of micro-cracks, wherein the buffer solution comprises one or more of: ammonium chloride, ammonium nitrate, ammonium acetate, ammonium hydroxide, potassium phosphate, sodium hydroxide, boric acid, potassium chloride, sodium chloride, potassium carbonate, potassium borate, potassium hydroxide, hydrochloric acid, or potassium acid phthalate;
  coating the exterior surface of the skin with an oxide slurry and depositing inorganic particles of the oxide slurry in pores of the porous inorganic material of the skin to increase a first density of the skin relative to a second density of a porous inorganic material of the matrix, the inorganic particles comprising particles of an oxide or a precursor of the oxide, wherein the oxide comprises alumina, silica, titania, zirconia, ceria, or aluminum silicate; and
  after coating the skin with the oxide slurry, applying a washcoat slurry comprising a catalytic material to at least the intersecting walls of the honeycomb body, wherein the catalytic material comprises platinum, palladium, or rhodium, or alloys thereof,
  wherein the oxide slurry comprises a second pH different from the first pH, and
  wherein the oxide slurry and the buffer solution form a gel that inhibits the inorganic particles of the oxide or the precursor of the oxide from entering the plurality of micro-cracks.

18. The method of claim 17, wherein the porous inorganic material of the skin is cordierite, and inorganic particles comprise cordierite or a cordierite precursor.

19. A method for treating a honeycomb body, the honeycomb body comprising a skin surrounding a matrix of cells defined by a plurality of intersecting walls, the method comprising:
  applying a buffer solution to an exterior surface of the skin, the buffer solution comprising a first pH, wherein a porous inorganic material of the skin comprises a plurality of micro-cracks, and wherein applying the buffer solution to the skin comprises introducing the buffer solution into the plurality of micro-cracks, wherein the buffer solution comprises one or more of: ammonium chloride, ammonium nitrate, ammonium acetate, ammonium hydroxide, potassium phosphate, sodium hydroxide, boric acid, potassium chloride, sodium chloride, potassium carbonate, potassium borate, potassium hydroxide, hydrochloric acid, or potassium acid phthalate; and
  coating the exterior surface of the skin with an oxide slurry and depositing inorganic particles of the oxide slurry in pores of the porous inorganic material of the skin to increase a first density of the skin relative to a second density of a porous inorganic material of the matrix, the inorganic particles comprising particles of an oxide or a precursor of the oxide,
  wherein the oxide comprises alumina, silica, titania, zirconia, ceria, or aluminum silicate;
  wherein the oxide slurry comprises a second pH different from the first pH, wherein the oxide slurry and the buffer solution form a gel that inhibits the inorganic particles of the oxide or the precursor of the oxide from entering the plurality of micro-cracks, and
  wherein the method increases the coefficient of thermal expansion of the skin measured at 800° C. by no more than two and a half times.

20. A method for treating a honeycomb body, the honeycomb body comprising a skin surrounding a matrix of cells defined by a plurality of intersecting walls, the method comprising:
  applying a buffer solution to an exterior surface of the skin, the buffer solution comprising a first pH, wherein a porous inorganic material of the skin comprises a plurality of micro-cracks, and wherein applying the buffer solution to the skin comprises introducing the buffer solution into the plurality of micro-cracks, wherein the buffer solution comprises one or more of: ammonium chloride, ammonium nitrate, ammonium acetate, ammonium hydroxide, potassium phosphate, sodium hydroxide, boric acid, potassium chloride, sodium chloride, potassium carbonate, potassium borate, potassium hydroxide, hydrochloric acid, or potassium acid phthalate; and
  coating the exterior surface of the skin with an oxide slurry and depositing inorganic particles of the oxide slurry in pores of the porous inorganic material of the skin to increase a first density of the skin relative to a second density of a porous inorganic material of the matrix, the inorganic particles comprising particles of an oxide or a precursor of the oxide, wherein the oxide comprises alumina, silica, titania, zirconia, ceria, or aluminum silicate;
  wherein the oxide slurry comprises a second pH different from the first pH,
  wherein the oxide slurry and the buffer solution form a gel that inhibits the inorganic particles of the oxide or the precursor of the oxide from entering the plurality of micro-cracks, and wherein the method increases the isostatic strength of the honeycomb body by 15% or more.

21. A method for treating a honeycomb body, the honeycomb body comprising a skin surrounding a matrix of cells defined by a plurality of intersecting walls, the method comprising:

applying a buffer solution to an exterior surface of the skin, the buffer solution comprising a first pH, wherein a porous inorganic material of the skin comprises a plurality of micro-cracks, and wherein applying the buffer solution to the skin comprises introducing the buffer solution into the plurality of micro-cracks, wherein the buffer solution comprises one or more of: ammonium chloride, ammonium nitrate, ammonium acetate, ammonium hydroxide, potassium phosphate, sodium hydroxide, boric acid, potassium chloride, sodium chloride, potassium carbonate, potassium borate, potassium hydroxide, hydrochloric acid, or potassium acid phthalate; and coating the exterior surface of the skin with an oxide slurry and depositing inorganic particles of the oxide slurry in pores of the porous inorganic material of the skin to increase a first density of the skin relative to a second density of a porous inorganic material of the matrix, the inorganic particles comprising particles of an oxide or a precursor of the oxide, wherein the oxide comprises alumina, silica, titania, zirconia, ceria, or aluminum silicate;

wherein the oxide slurry comprises a second pH different from the first pH, wherein the oxide slurry and the buffer solution form a gel that inhibits the inorganic particles of the oxide or the precursor of the oxide from entering the plurality of micro-cracks, wherein applying the buffer solution to the skin of the honeycomb comprises applying the buffer solution to only the skin of the honeycomb body and wherein coating the skin comprises applying the oxide slurry to only the skin of the honeycomb body, wherein the density of the skin is 30% to 60% greater than a density of the porous inorganic material of the matrix, and wherein an isostatic strength of the honeycomb body is increased by 40% or more relative to an isostatic strength of the honeycomb body prior to application of the oxide slurry.

* * * * *